(12) United States Patent
Zhang et al.

(10) Patent No.: US 12,044,826 B2
(45) Date of Patent: *Jul. 23, 2024

(54) OPTICAL IMAGING LENS ASSEMBLY HAVING SPECIFIED RELATIONSHIP OF FOCAL LENGTH TO FIELD OF VIEW

(71) Applicant: Zhejiang Sunny Optical Co., Ltd, Ningbo (CN)

(72) Inventors: Jiaying Zhang, Ningbo (CN); Biao Xu, Ningbo (CN)

(73) Assignee: Zhejiang Sunny Optical Co., Ltd (CN)

( * ) Notice: Subject to any disclaimer, the term of this patent is extended or adjusted under 35 U.S.C. 154(b) by 877 days.

This patent is subject to a terminal disclaimer.

(21) Appl. No.: 17/020,182

(22) Filed: Sep. 14, 2020

(65) Prior Publication Data

US 2020/0409117 A1    Dec. 31, 2020

Related U.S. Application Data

(63) Continuation of application No. PCT/CN2019/102145, filed on Aug. 23, 2019.

(30) Foreign Application Priority Data

Dec. 11, 2018    (CN) ........................ 201811511166.4

(51) Int. Cl.
*G02B 9/60*       (2006.01)
*G02B 13/00*      (2006.01)
(Continued)

(52) U.S. Cl.
CPC ........... *G02B 13/0045* (2013.01); *G02B 9/60* (2013.01); *G02B 27/0081* (2013.01);
(Continued)

(58) Field of Classification Search
CPC . G02B 13/0045; G02B 13/18; G02B 27/0025
See application file for complete search history.

(56) References Cited

U.S. PATENT DOCUMENTS 11,561,377 B2 * 1/2023 Chen .................. G02B 13/0045
2006/0017834 A1  1/2006 Konno et al.
(Continued)

FOREIGN PATENT DOCUMENTS

CN    101819315 A    9/2010
CN    102346293 A    2/2012
(Continued)

*Primary Examiner* — Ryan S Dunning
(74) *Attorney, Agent, or Firm* — Barnes & Thornburg LLP

(57) ABSTRACT

The present disclosure discloses an optical imaging lens assembly including a first lens, a second lens, a third lens, a fourth lens, and a fifth lens, which are sequentially arranged from an object side to an image side along an optical axis. The first lens has positive refractive power, and an object-side surface of the first lens is a convex surface. The second lens has refractive power, and an image-side surface of the second lens is a concave surface. The third lens has refractive power. The fourth lens has refractive power. The fifth lens has negative refractive power. A total effective focal length f of the optical imaging lens assembly and a combined focal length f123 of the first lens, the second lens and the third lens satisfy 0.6<f/f123<1.

17 Claims, 17 Drawing Sheets

(51) Int. Cl.
*G02B 13/18* (2006.01)
*G02B 27/00* (2006.01)
*G02B 30/00* (2020.01)
*G03B 30/00* (2021.01)

(52) U.S. Cl.
CPC .......... *G02B 13/18* (2013.01); *G02B 27/0012* (2013.01); *G03B 30/00* (2021.01)

(56) References Cited

U.S. PATENT DOCUMENTS

| | | | |
|---|---|---|---|
| 2007/0183062 A1 | 8/2007 | Nakamura | |
| 2019/0056569 A1* | 2/2019 | Yoo | G02B 9/64 |
| 2021/0055515 A1* | 2/2021 | Dai | G02B 13/18 |

FOREIGN PATENT DOCUMENTS

| | | |
|---|---|---|
| CN | 203480113 U | 3/2014 |
| CN | 203519911 U | 4/2014 |
| CN | 203630433 U | 6/2014 |
| CN | 103969791 A | 8/2014 |
| CN | 104407430 A | 3/2015 |
| CN | 104570294 A | 4/2015 |
| CN | 105393156 A | 3/2016 |
| CN | 105549185 A | 5/2016 |
| CN | 206757160 U | 12/2017 |
| CN | 206990890 U | 2/2018 |
| CN | 208044177 U | 11/2018 |
| CN | 109298516 A | 2/2019 |

* cited by examiner

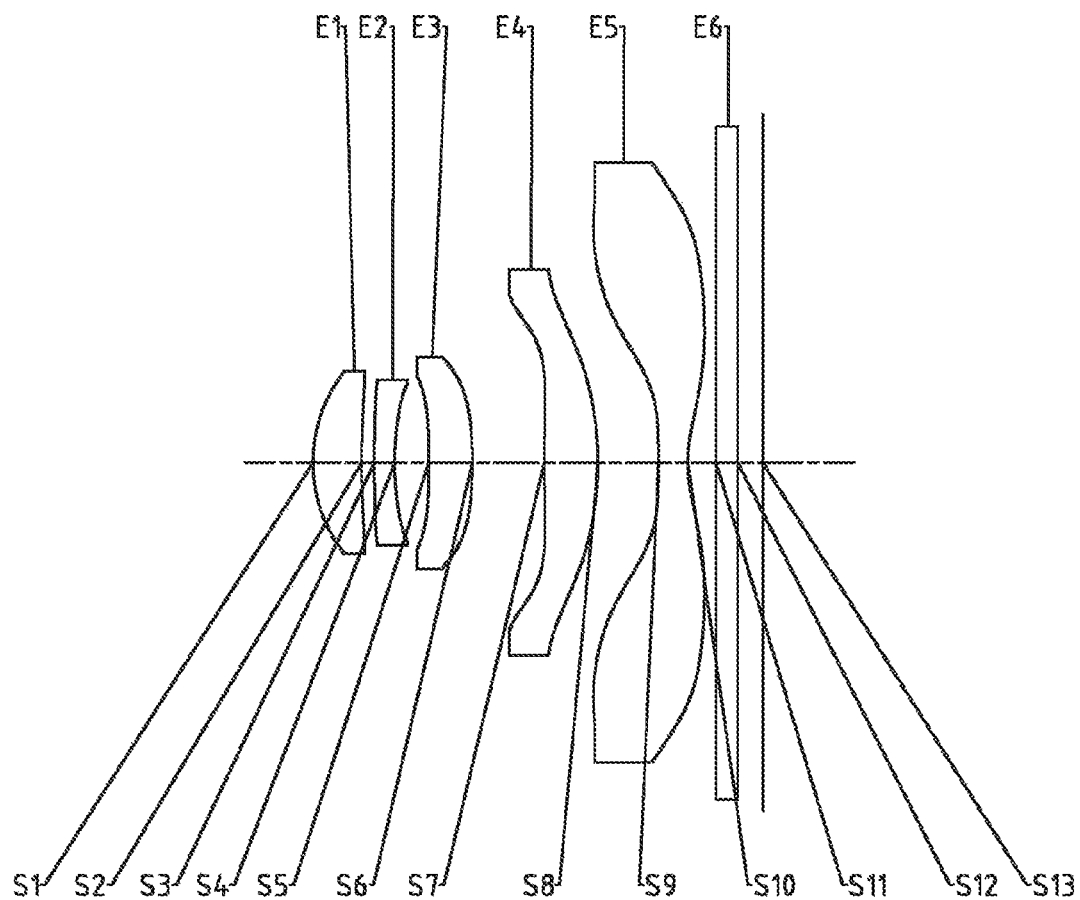
Fig. 1
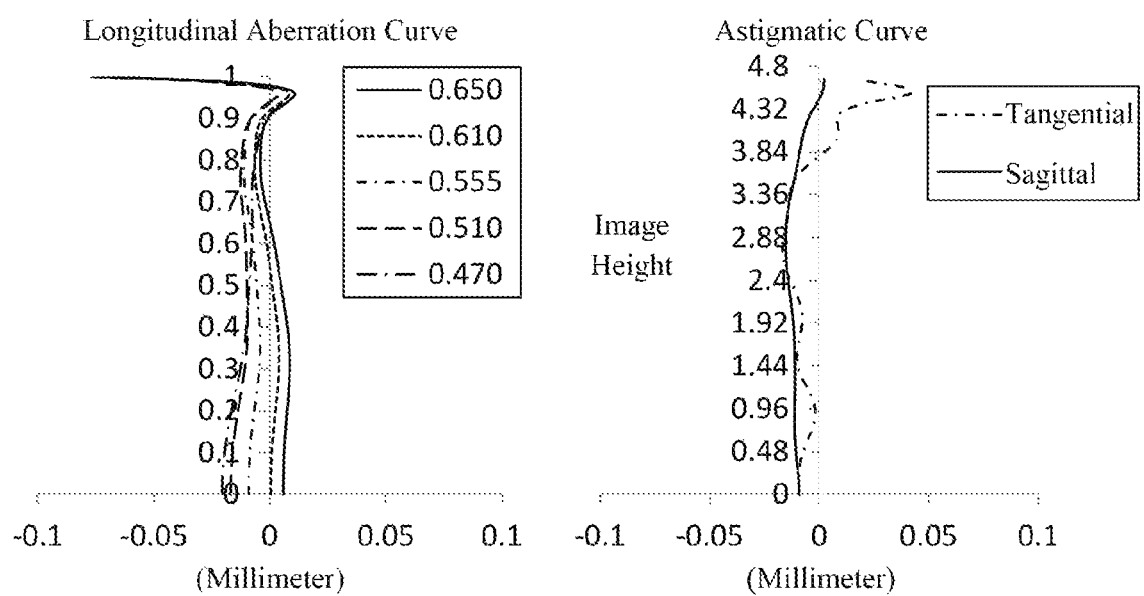
Fig. 2AFig. 2B

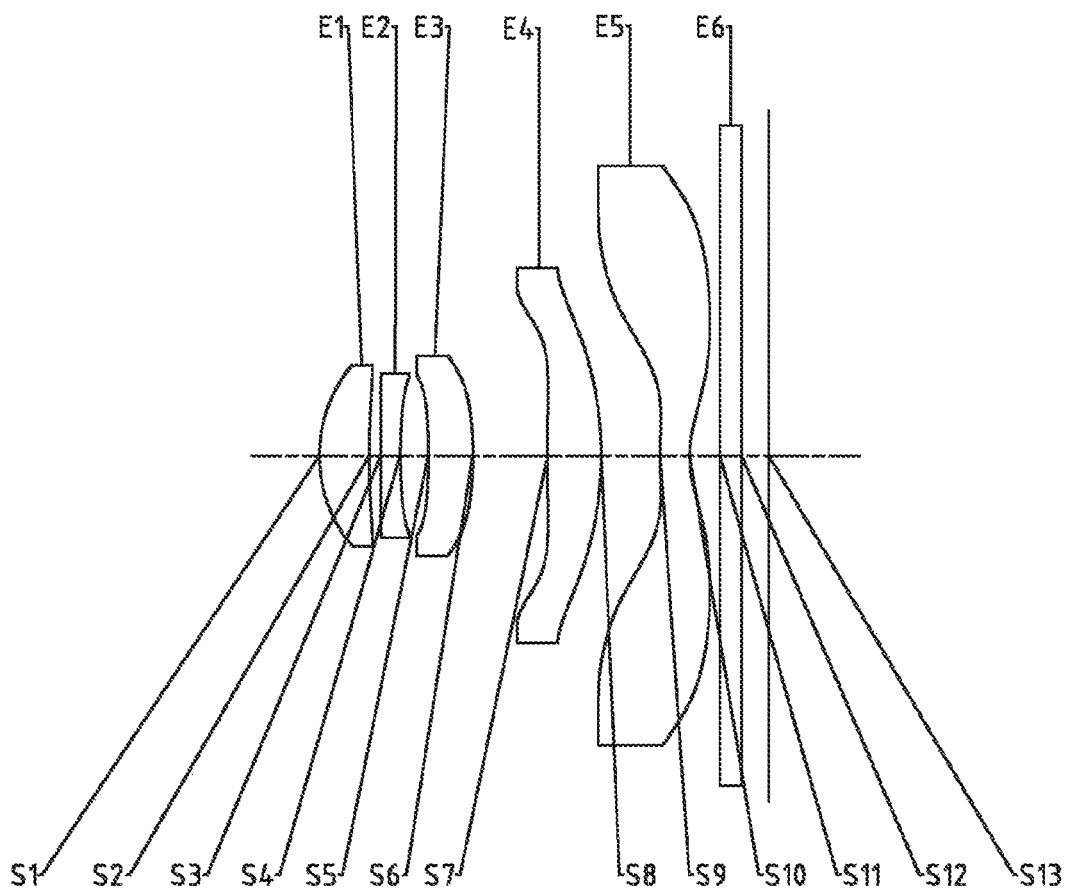
Fig. 13
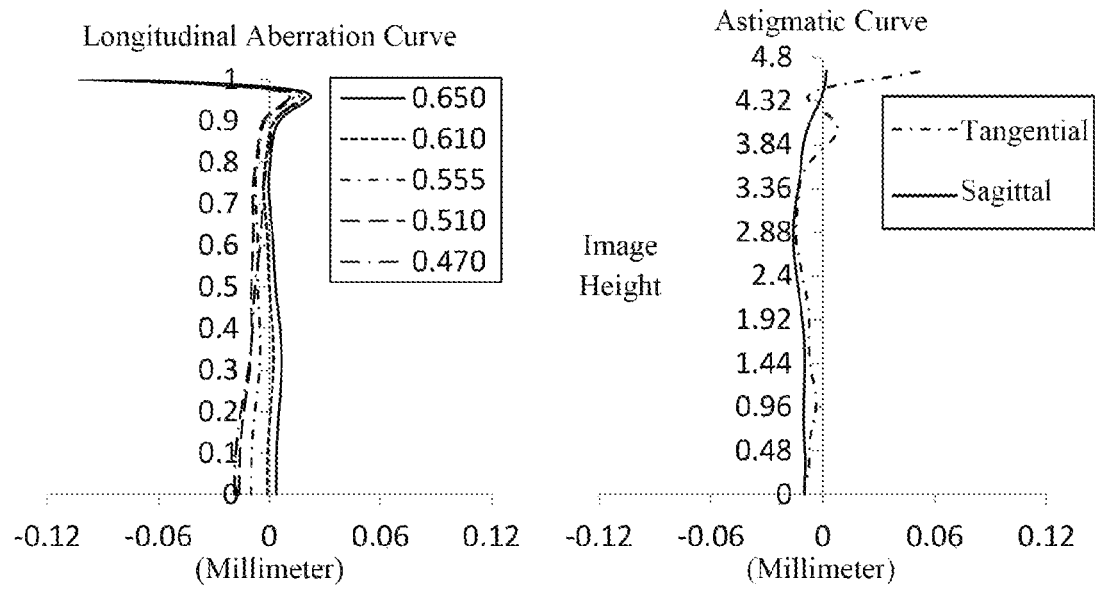
Fig. 14A
Fig. 14B

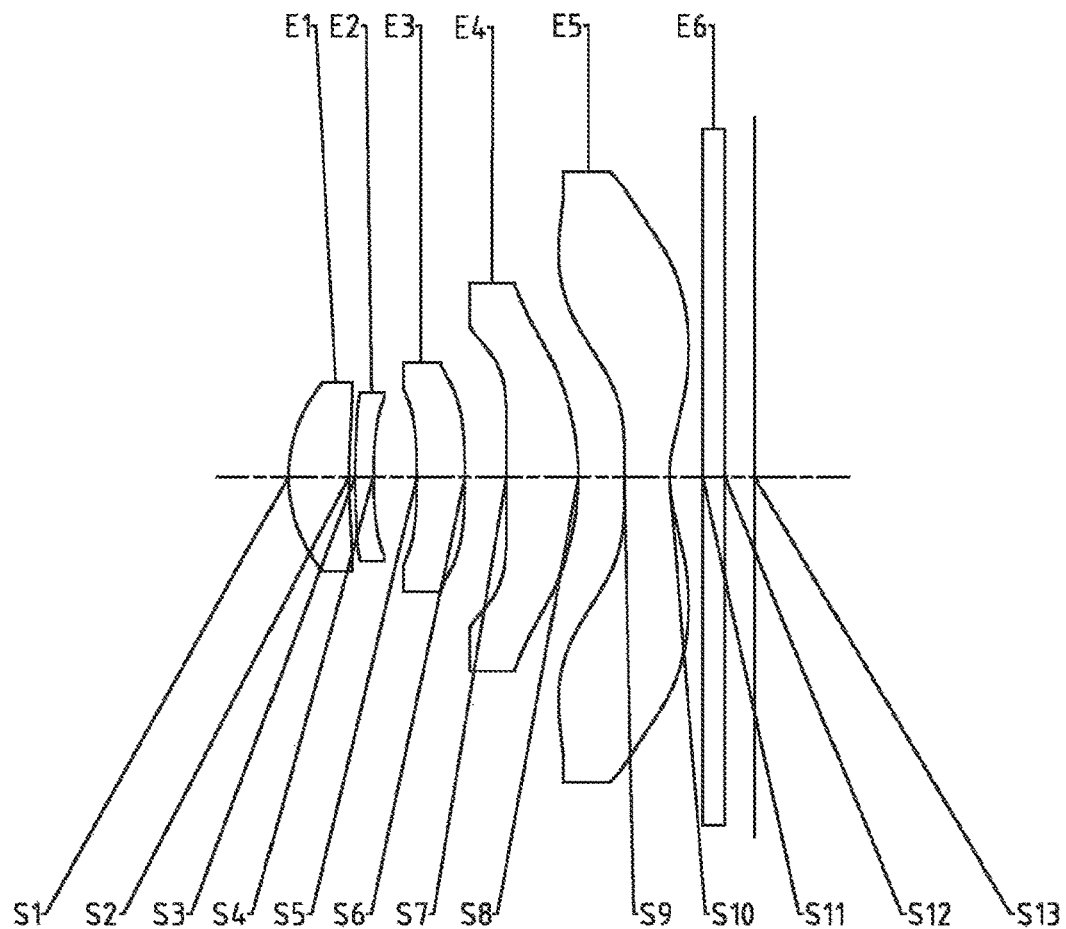
Fig. 17
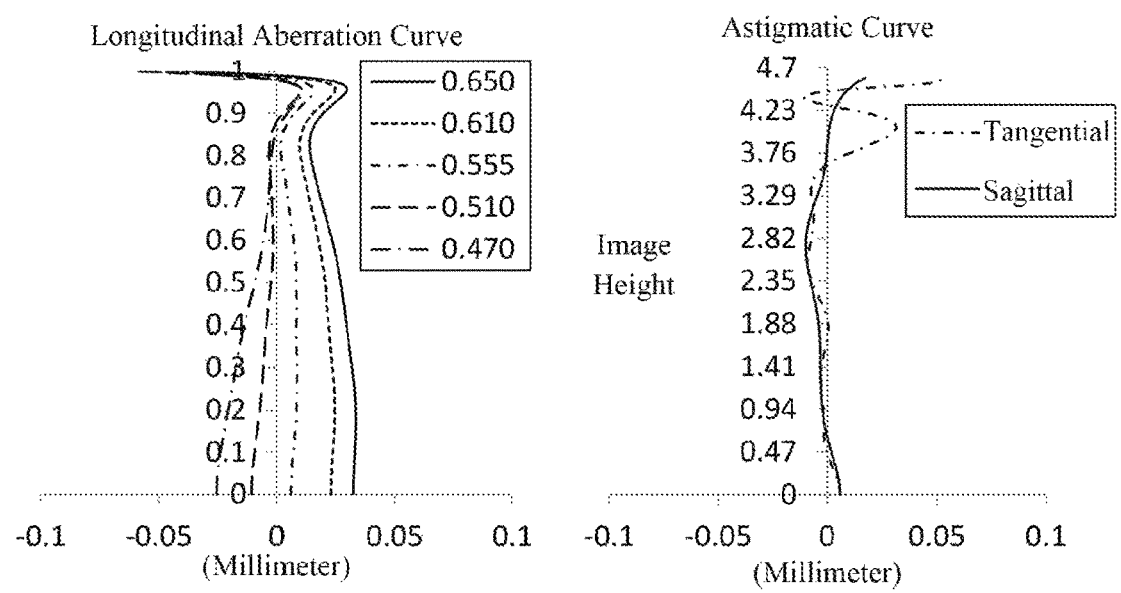
Fig. 18A
Fig. 18B

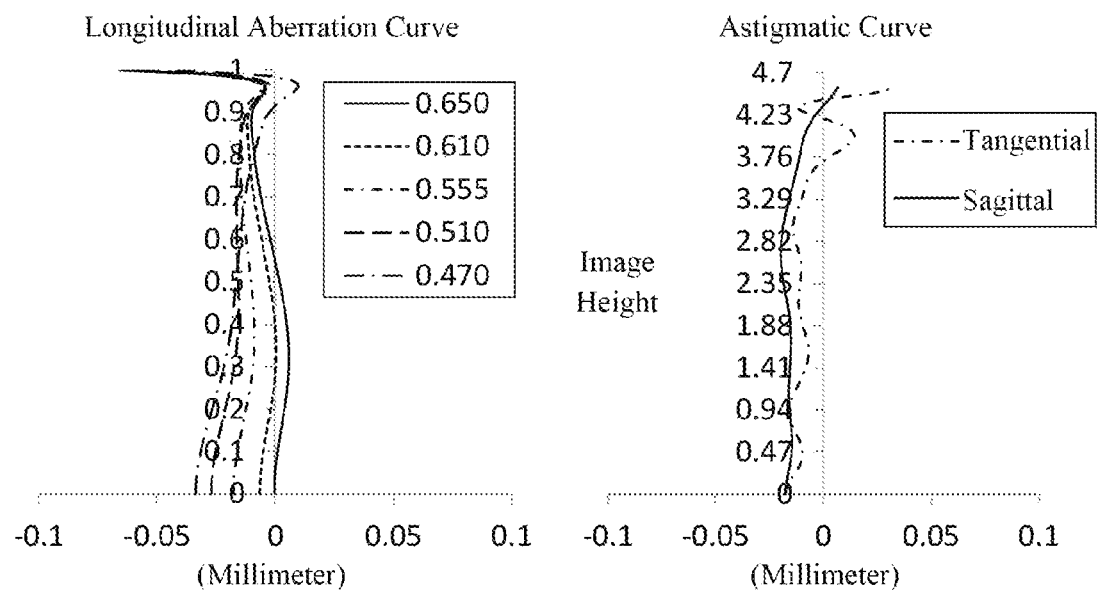
Fig. 20A
Fig. 20B
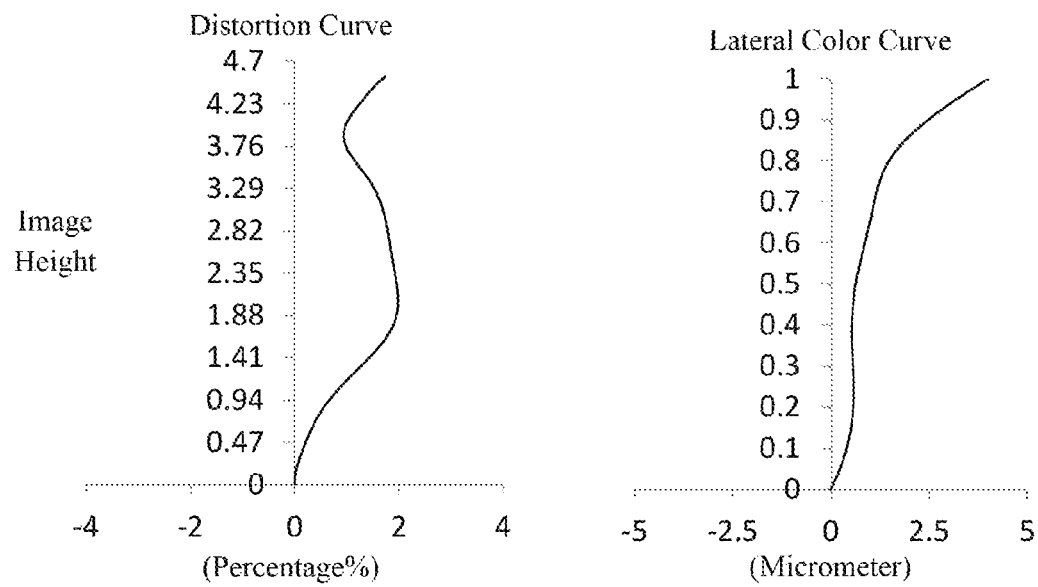
Fig. 20C
Fig. 20D

OPTICAL IMAGING LENS ASSEMBLY HAVING SPECIFIED RELATIONSHIP OF FOCAL LENGTH TO FIELD OF VIEW

CROSS-REFERENCE TO RELATED APPLICATIONS

The present patent application is a continuation of International Application No. PCT/CN2019/102145, filed on Aug. 23, 2019, which claims the priority from and the benefit of Chinese Patent Application No. 201811511166.4, filed before the National Intellectual Property Administration (CNIPA) on Dec. 11, 2018. Both of the aforementioned patent applications are hereby incorporated by reference in their entireties.

TECHNICAL FIELD

The present disclosure relates to an optical imaging lens assembly, and specifically to an optical imaging lens assembly including five lenses.

BACKGROUND

With the development of science and technology, portable electronic products are gradually emerging. Meanwhile, a kind of portable electronic products with an image capture function have been more favored by people. Therefore, an imaging lens assembly applicable to the portable electronic product is gradually and increasingly demanded in the market. On the one hand, since portable electronic products, such as smart phones, tend to be miniaturized, the total length of the lens assembly may be limited, thereby increasing the design difficulty of the lens assembly. On the other hand, as the performance of the electronic photosensitive element, such as a photosensitive charge-coupled device (CCD) or complementary metal-oxide semiconductor (CMOS), is improved and the size thereof is reduced, the number of pixels in the photosensitive element is increased and the size of each pixel is reduced. Accordingly, a higher requirement for a high imaging quality of the imaging lens assembly with the miniaturized size is desired to be achieved.

In addition, optical materials have been developed rapidly. The research and application of certain novel optical materials may provide a bigger opportunity to ensure the imaging quality of the optical imaging lens assembly while effectively reducing design difficulties thereof.

SUMMARY

The present disclosure provides an optical imaging lens assembly applicable to portable electronic products that can at least solve or partially solve at least one of the above technical problems in the prior art.

The present disclosure provides an optical imaging lens assembly including a first lens, a second lens, a third lens, a fourth lens, and a fifth lens, which are sequentially arranged from an object side to an image side along an optical axis. The first lens may have positive refractive power, and an object-side surface of the first lens may be a convex surface. The second lens may have refractive power, and an image-side surface of the second lens may be a concave surface. The third lens has refractive power. The fourth lens has refractive power. The fifth lens may have negative refractive power.

In one implementation, a total effective focal length f of the optical imaging lens assembly and a combined focal length f123 of the first lens, the second lens and the third lens may satisfy $0.6 < f/f123 < 1$.

In one implementation, the total effective focal length f of the optical imaging lens assembly and half of a maximal field-of-view angle Semi-FOV of the optical imaging lens assembly may satisfy $4.1 \text{ mm} < f*\tan(\text{Smei-FOV}) < 4.8 \text{ mm}$.

In one implementation, an effective focal length f1 of the first lens and the total effective focal length f of the optical imaging lens assembly may satisfy $0.5 < f1/f < 1$.

In one implementation, the total effective focal length f of the optical imaging lens assembly, an effective focal length f1 of the first lens and an effective focal length f5 of the fifth lens may satisfy $0.2 < f/(f1-f5) < 0.7$.

In one implementation, an effective focal length f1 of the first lens and a combined focal length f45 of the fourth lens and the fifth lens may satisfy $-0.6 < f1/f45 < 0$.

In one implementation, a radius of curvature R1 of the object-side surface of the first lens and a radius of curvature R4 of the image-side surface of the second lens may satisfy $0.2 < (R4-R1)/(R4+R1) < 0.7$.

In one implementation, a center thickness CT2 of the second lens along the optical axis and a center thickness CT3 of the third lens along the optical axis may satisfy $0.2 < CT2/CT3 < 0.5$.

In one implementation, a center thickness CT4 of the fourth lens along the optical axis and a center thickness CT5 of the fifth lens along the optical axis may satisfy $0.4 < CT5/CT4 < 0.9$.

In one implementation, a spaced interval T12 between the first lens and the second lens along the optical axis, a spaced interval T23 between the second lens and the third lens along the optical axis, a spaced interval T34 between the third lens and the fourth lens along the optical axis and a spaced interval T45 between the fourth lens and the fifth lens along the optical axis may satisfy $0.2 < (T12+T23)/(T34+T45) < 0.7$.

In one implementation, the optical imaging lens assembly may further include a stop, and a distance SD along the optical axis from the stop to an image-side surface of the fifth lens and a distance TTL along the optical axis from the object-side surface of the first lens to an imaging plane of the optical imaging lens assembly may satisfy $0.6 < SD/TTL < 0.9$.

In one implementation, a distance TD along the optical axis from the object-side surface of the first lens to the image-side surface of the fifth lens and a distance SL along the optical axis from the stop to the imaging plane of the optical imaging lens assembly may satisfy $0.7 < TD/SL < 1$.

In one implementation, the distance TTL along the optical axis from the object-side surface of the first lens to the imaging plane of the optical imaging lens assembly and half of a diagonal length ImgH of an effective pixel area on the imaging plane of the optical imaging lens assembly may satisfy $TTL/ImgH < 1.5$.

In one implementation, an edge thickness of the second lens ET2, an edge thickness of the third lens ET3, an edge thickness of the fourth lens ET4, and an edge thickness of the fifth lens ET5 may satisfy $0.2 < ET5/(ET2+ET3+ET4) < 0.7$.

In one implementation, SAG31, SAG32, SAG51 and SAG52 may satisfy $0.2 < (SAG31+SAG32)/(SAG51+SAG52) < 0.7$, where SAG31 is a distance along the optical axis from an intersection of an object-side surface of the third lens and the optical axis to a vertex of an effective radius of the object-side surface of the third lens, SAG32 is a distance along the optical axis from an intersection of an image-side surface of the third lens and the optical axis to a vertex of an effective radius of the image-side surface of the third lens, SAG51 is a distance along the optical axis from an intersection of an object-side surface of the fifth lens and the optical axis to a vertex of an effective radius of the object-side surface of the fifth lens, and SAG52 is a distance along the optical axis from an intersection of an image-side surface of the fifth lens and the optical axis to a vertex of an effective radius of the image-side surface of the fifth lens.

In one implementation, an abbe number V3 of the third lens may satisfy $36<V3<40$.

In one implementation, a refractive index N3 of the third lens may satisfy $1.55<N3<1.58$.

According to the present disclosure, the optical imaging lens assembly with five lenses, as described above, has at least one advantages such as miniaturizing its volume, and obtaining large imaging area and high image quality, and the like by properly configuring the refractive power, the surface shape, the center thickness of each lens and the spaced interval along the optical axis between the lenses.

BRIEF DESCRIPTION OF THE DRAWINGS

Other features, purpose and advantages of the present disclosure will become apparent through detailed description of the non-limiting implementations given in conjunction with the accompanying drawings. In the drawings:

FIG. 1 is a schematic structural view of an optical imaging lens assembly according to embodiment 1 of the present disclosure.

FIGS. 2A-2D illustrate a longitudinal aberration curve, an astigmatic curve, a distortion curve and a lateral color curve of the optical imaging lens assembly according to embodiment 1, respectively.

FIG. 13 is a schematic structural view of an optical imaging lens assembly according to embodiment 7 of the present disclosure.

FIGS. 14A-14D illustrate a longitudinal aberration curve, an astigmatic curve, a distortion curve and a lateral color curve of the optical imaging lens assembly according to embodiment 7, respectively.

FIG. 17 is a schematic structural view of an optical imaging lens assembly according to embodiment 9 of the present disclosure.

FIGS. 18A-18D illustrate a longitudinal aberration curve, an astigmatic curve, a distortion curve and a lateral color curve of the optical imaging lens assembly according to embodiment 9, respectively.

FIGS. 20A-20D illustrate a longitudinal aberration curve, an astigmatic curve, a distortion curve and a lateral color curve of the optical imaging lens assembly according to embodiment 10, respectively.

DETAILED DESCRIPTION OF EMBODIMENTS

Figure 2C:
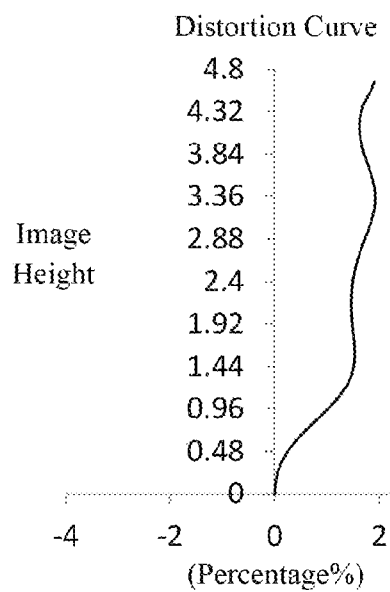

For a better understanding of the present disclosure, various aspects of the present disclosure will be described in more detail with reference to the drawings. It should be understood that, these detailed descriptions are merely used for describing exemplary implementations of the present disclosure, but not in any way for limiting the scope of the present disclosure. Throughout the specification, the same reference numerals refer to the same elements. The expression "and/or" includes any and all combinations of one or more of the associated listed items.

It should be noted that, in the present specification, the expressions such as first, second and third are merely for distinguishing one feature from another feature without introducing any limitation on the corresponding features. Thus, a first lens discussed below may be referred to as a second lens or a third lens without departing from the teachings of the present disclosure.

In the accompanying drawings, for convenience of the description, thicknesses, sizes and shapes of lenses have been slightly exaggerated. Specifically, spherical or aspheric shapes shown in the accompanying drawings are shown as examples. That is, spherical or aspheric shapes are not limited to those shown in the accompanying drawings. The accompanying drawings are merely examples, not strictly drawn to scale.

Herein, a paraxial region refers to a region near the optical axis. If a surface of a lens is a convex surface and the position of the convex is not defined, it indicates that the surface of the lens is convex at least in the paraxial region. If a surface of a lens is a concave surface and the position of the concave is not defined, it indicates that the surface of the lens is concave at least in the paraxial region. The surface of each lens closest to the object side is referred to as an object-side surface, and the surface of each lens closest to the image side is referred to as an image-side surface.

It should be further understood that the terms "comprising/comprise", "including/include", "having/have" and "containing/contain", when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing implementations of the present disclosure, refers to "one or more implementations of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the embodiments in the present disclosure and the features in the embodiments may be combined with each other on a non-conflict basis. The present disclosure will be described in detail below with reference to the accompanying drawings and in combination with the embodiments. The features, principles, and other aspects of the present disclosure are described in detail below.

An optical imaging lens assembly according to an exemplary implementation of the present disclosure may include, for example, five lenses (i.e., a first lens, a second lens, a third lens, a fourth lens, and a fifth lens) having refractive power. The five lenses are arranged sequentially from an object side to an image side along an optical axis, and there may be an air gap between adjacent lenses.

In an exemplary implementation, the first lens may have positive refractive power, and an object-side thereof may be a convex surface. The second lens has positive or negative refractive power, and an image-side surface thereof may be a concave surface. The third lens has positive or negative refractive power. The fourth lens has positive or negative refractive power. The fifth lens may have negative refractive power. The first lens is configured to have positive refractive power and the object-side surface thereof is a convex surface, such that it is beneficial for system to increase the field-of-view angle and to reduce the light incident angle at the stop position, and thus the pupil aberration may be reduced, and the imaging quality of the system may be improved. The second lens is configured to have refractive power, and an image-side thereof is a concave surface, such that it is beneficial for system to improve a relative illumination at off-axis field, and to increase the field-of-view angle. The fifth lens is configured to have negative refractive power, such that a total length of the system may be effectively shorten, thereby facilitating to achieve the miniaturization of the lens assembly.

In an exemplary implementation, the optical imaging lens assembly according to the present disclosure may satisfy: $4.1 \text{ mm} < f*\tan(\text{Smei-FOV}) < 4.8 \text{ mm}$, where $f$ is the total effective focal length of the optical imaging lens assembly and Semi-FOV is half of a maximal field-of-view angle of the optical imaging lens assembly. More specifically, f and Semi-FOV may further satisfy $4.42 \text{ mm} \leq f*\tan(\text{Smei-FOV}) \leq 4.57 \text{ mm}$ By restricting half of a maximal field-of-view angle and the total effective focal length of the optical imaging lens assembly, it is possible for the lens assembly system to achieve a imaging effect of a large imaging area.

In an exemplary implementation, the optical imaging lens assembly according to the present disclosure may satisfy: $TTL/ImgH < 1.5$, where TTL is a distance along the optical axis from the object-side surface of the first lens to an imaging plane of the optical imaging lens assembly, and ImgH is half of a diagonal length of an effective pixel area on the imaging plane of the optical imaging lens assembly. More specifically, TTL and ImgH may further satisfy $1.29 \leq TTL/ImgH \leq 1.33$. By controlling a ratio of TTL to ImgH to be within an appropriate range, the size of the lens assembly system is effectively compressed, the ultra-thin characteristics of the lens assembly are ensured, and miniaturization of the imaging system is advantageously achieved.

In an exemplary implementation, the optical imaging lens assembly according to the present disclosure may satisfy: $0.5 < f1/f < 1$, where f1 is an effective focal length of the first lens, and $f$ is the total effective focal length of the optical imaging lens assembly. More specifically, f1 1 and $f$ may further satisfy $0.81 \leq f1/f \leq 0.99$. By controlling the amount of contribution of the refractive power of the first lens to the total focal length of the lens assembly system, the deflection angle of the light may be reduced, and the imaging quality of the lens assembly system may be improved. By satisfying $0.5 < f1/f < 1$, refractive power would not be concentrated to one single lens, and it is beneficial to shorten the total length of the system and to achieve a miniaturization feature of the lens assembly.

In an exemplary implementation, the optical imaging lens assembly according to the present disclosure may satisfy: $0.6 < f/f123 < 1$, where f is the total effective focal length of the optical imaging lens assembly, and f123 is a combined focal length of the first lens, the second lens, and the third lens. More specifically, f and f123 may further satisfy $0.80 \leq f/f123 \leq 0.98$. By controlling values of this conditional expression to be within an appropriate range, it is possible to control aberrations of the first to third lenses to compensate the aberration(s) produced by the previous lens(es), and thus the aberration of the entire lens assembly system may be maintained in an appropriate level.

In an exemplary implementation, the optical imaging lens assembly according to the present disclosure may satisfy: $0.2 < f/(f1-f5) < 0.7$, where f is the total effective focal length of the optical imaging lens assembly, f1 is the effective focal length of the first lens, and f5 is an effective focal length of the fifth lens. More specifically, f, f1, and f5 may further satisfy $0.37 \leq f/(f1-f5) \leq 0.66$. By controlling values of this conditional expression to be within an appropriate range, the lens assembly system may possess a relatively small spherical aberration, and a good imaging quality at the on-axis field.

In an exemplary implementation, the optical imaging lens assembly according to the present disclosure may satisfy: $-0.6 < f1/f45 < 0$, where f1 is the effective focal length of the first lens, and f45 is a combined focal length of the fourth lens and the fifth lens. More specifically, f1 and f45 may further satisfy $-0.53 \leq f1/f45 \leq -0.12$. By controlling a ratio of the effective focal length of the first lens to the combined focal length of the fourth lens and the fifth lens to be within an appropriate range, it is possible to reduce the aberrations at an edge field, while the problem of increasing the system tolerance sensitivity, which is resulted from the excessive concentration of refractive power, may be prevented.

In an exemplary implementation, the optical imaging lens assembly according to the present disclosure may satisfy: $0.2<(R4-R1)/(R4+R1)<0.7$, where R1 is a radius of curvature of the object-side surface of the first lens, and R4 is a radius of curvature of the image-side surface of the second lens. More specifically, R1 and R4 may further satisfy $0.22 \leq (R4-R1)/(R4+R1) \leq 0.60$. When a ratio of the radius of curvature of the object-side surface of the first lens to the radius of curvature of the image-side surface of the second lens is configured properly as such, it may be possible to obtain a good deflection path of light ray, and may be beneficial to improve refractive power of the second lens and the relative illumination of the lens assembly system. Thus, the imaging quality thereof may be improved effectively.

In an exemplary implementation, the optical imaging lens assembly according to the present disclosure may satisfy: $0.2<CT2/CT3<0.5$, where CT2 is a center thickness of the second lens along the optical axis, and CT3 is a center thickness of the third lens along the optical axis. More specifically, CT2 and CT3 may further satisfy $0.34 \leq CT2/CT3 \leq 0.48$. By controlling a ratio of the center thickness of the second lens to the center thickness of the third lens, the distortion degree of the entire lens assembly system at respective fields may be maintained in a predetermined range. Further, it is beneficial for the lens module to balance the relationship between the miniaturization attribute and the increase degree in the Flange size of the second lens, and thus to achieve a beneficial assembly in a same direction.

In an exemplary implementation, the optical imaging lens assembly according to the present disclosure may satisfy: $0.4<CT5/CT4<0.9$, where CT4 is a center thickness of the fourth lens along the optical axis, and CT5 is a center thickness of the fifth lens along the optical axis. More specifically, CT5 and CT4 may further satisfy $0.47 \leq CT5/CT4 \leq 0.89$. By controlling a ratio of the center thickness of the fourth lens to the center thickness of the fifth lens, it is possible to control the distortion of the lens assembly system properly, which maintain the total distortion thereof to be within a predetermined range, and the miniaturization attribute of the lens assembly may be achieved advantageously.

In an exemplary implementation, the optical imaging lens assembly according to the present disclosure may satisfy: $0.2<(T12+T23)/(T34+T45)<0.7$, where T12 is a spaced interval between the first lens and the second lens along the optical axis, T23 is a spaced interval between the second lens and the third lens along the optical axis, T34 is a spaced interval between the third lens and the fourth lens along the optical axis, and T45 is a spaced interval between the fourth lens and the fifth lens along the optical axis. More specifically, T12, T23, T34, and T45 may further satisfy $0.30 \leq (T12+T23)/(T34+T45) \leq 0.59$. By controlling the spaced intervals between adjacent lenses in the optical system, the curvature of field of the system may be ensured effectively, and thus the system may possess a good imaging quality at the off-axis field, while the total length thereof may be compressed effectively.

In an exemplary implementation, the above-described optical imaging lens assembly may further include a stop to improve the imaging quality of the lens assembly. The stop may disposed between the objet side and the first lens.

In an exemplary implementation, the optical imaging lens assembly according to the present disclosure may satisfy: $0.6<SD/TTL<0.9$, where SD is a distance along the optical axis from the stop to an image-side surface of the fifth lens, and TTL is the distance along the optical axis from the object-side surface of the first lens to an imaging plane of the optical imaging lens assembly. More specifically, SD and TTL may further satisfy $0.74 \leq SD/TTL \leq 0.80$. By controlling the position of the stop as such, the relative illuminance of the system may be improved, and the coma, astigmatic, distortion, and axial chromatic aberration associated with the stop may be effectively corrected. Further, the imaging quality may be improved, and the miniaturization attribute of the lens assembly may be achieved advantageously.

In an exemplary implementation, the optical imaging lens assembly according to the present disclosure may satisfy: $0.7<TD/SL<1$, where TD is a distance along the optical axis from the object-side surface of the first lens to the image-side surface of the fifth lens, and SL is a distance along the optical axis from the stop to the imaging plane of the optical imaging lens assembly. More specifically, TD and SL may further satisfy $0.87 \leq TD/SL \leq 0.93$. As such, the position of the stop is controlled properly. Accordingly, the total length of the system is effectively shortened by controlling the ratio of TD to SL, thereby obtaining the miniaturization attribute of the lens assembly.

In an exemplary implementation, the optical imaging lens assembly according to the present disclosure may satisfy: $0.2<ET5/(ET2+ET3+ET4)<0.7$, where ET2 is an edge thickness of the second lens, ET3 is an edge thickness of the third lens, ET4 is an edge thickness of the fourth lens, and ET5 is an edge thickness of the fifth lens. More specifically, ET2, ET3, ET4, and ET5 may further satisfy $0.23 \leq ET5/(ET2+ET3+ET4) \leq 0.64$. By controlling a ratio of the edge thickness of the fifth lens to the sum of the edge thicknesses of the second, third, and fourth lenses to be within an appropriate range, it may effectively decrease the system size, and ensure a good process-ability characteristic of the optical elements.

In an exemplary implementation, the optical imaging lens assembly according to the present disclosure may satisfy: $0.2 \leq (SAG31+SAG32)/(SAG51+SAG52) \leq 0.7$, where SAG31 is a distance along the optical axis from an intersection of the object-side surface of the third lens and the optical axis to a vertex of an effective radius of the object-side surface of the third lens, SAG32 is a distance along the optical axis from an intersection of the image-side surface of the third lens and the optical axis to a vertex of an effective radius of the image-side surface of the third lens, SAG51 is a distance along the optical axis from an intersection of the object-side surface of the fifth lens and the optical axis to a vertex of an effective radius of the object-side surface of the fifth lens, and SAG52 is a distance along the optical axis from an intersection of the image-side surface of the fifth lens and the optical axis to a vertex of an effective radius of the image-side surface of the fifth lens. More specifically, SAG31, SAG32, SAG51, and SAG52 may further satisfy $0.26 \leq (SAG31+SAG32)/(SAG51+SAG52) \leq 0.55$. By satisfying this conditional expression, incident angles of chief ray at the object-side surfaces of the third and fifth lenses is reduced effectively, the match degree of the lens assembly with the chip is increased, and the relationship between the miniaturization attribute of the lens module and the relative illuminance at off-axis field is balanced advantageously.

In an exemplary implementation, the optical imaging lens assembly according to the present disclosure may satisfy: 36<V3<40, where V3 is an abbe number of the third lens. More specifically, V3 may further satisfy 37≤V3≤39, e.g., V3=38.00. By controlling the abbe number of the third lens properly, the aberration of the lens assembly system may be improved effectively, and the imaging quality may be further improved.

In an exemplary implementation, the optical imaging lens assembly according to the present disclosure may satisfy: 1.55<N3<1.58, where N3 is a refractive index of the third lens. More specifically, N3 may further satisfy 1.56≤N3≤1.58, e.g., N3=1.57. By using a material having an appropriate refractive index, refractive power of the third lens is effectively improved, thereby contributing to the improvement of the relative illuminance of the system, and facilitating the correction of the coma and sinusoidal aberrations of the optical system, so that the optical system possesses a good imaging performance.

Alternatively, the optical imaging lens assembly described above may further include an optical filter to correct chromatic aberration and/or a protective glass for protecting a photosensitive element on the imaging plane.

The optical imaging lens assembly according to the above implementations of the present disclosure may employ a plurality of lenses, such as five lenses as described above. By properly configuring the refractive power, the surface shape, the center thickness of each lens, and spaced distances along the optical axis between the lenses, the size and the sensitivity of the optical imaging lens assembly can be effectively reduced, and the processability of the optical imaging lens assembly can be improved, such that the optical imaging lens assembly is more advantageous for production processing and can be applied to portable electronic products. The optical imaging lens assembly configured as described above may further have advantages such as obtaining a ultra-thin property, large imaging area and high image quality. In addition, the imaging performance of the lens assembly may be further improved by properly selecting the material of the third lens.

In the implementations of the present disclosure, at least one of the surfaces of each lens is aspheric, i.e., at least one of the object-side surface and the image-side surface of each of the first lens, the second lens, the third lens, the fourth lens and the fifth lens is aspheric. The aspheric lens is characterized by a continuous change in curvature from the center of the lens to the periphery of the lens. Unlike a spherical lens having a constant curvature from the center of the lens to the periphery of the lens, the aspheric lens has a better radius of curvature characteristic, and has the advantages of improving distortion aberration and improving astigmatic aberration. By using an aspheric lens, the aberrations that occur during imaging can be eliminated as much as possible, and thus improving imaging quality. Alternatively, both the object-side surface and the image-side surface of each of the first lens, the second lens, the third lens, the fourth lens and the fifth lens are aspheric.

However, it will be understood by those skilled in the art that the number of lenses constituting the optical imaging lens assembly can be varied to achieve the various results and advantages described in this specification without departing from the technical solution claimed by the present disclosure. For example, although the implementation are described by taking five lenses as an example, the optical imaging lens assembly is not limited to including five lenses. The optical imaging lens assembly can also include other numbers of lenses if desired.

Specific embodiments applicable to the optical imaging lens assembly of the above implementations will be further described below with reference to the accompanying drawings.

Embodiment 1

An optical imaging lens assembly according to embodiment 1 of the present disclosure is described below with reference to FIG. 1 to FIG. 2D. FIG. 1 is a schematic structural view of an optical imaging lens assembly according to embodiment 1 of the present disclosure.

As shown in FIG. 1, the optical imaging lens assembly according to an exemplary implementation of the present disclosure includes, sequentially from an object side to an image side along an optical axis: a first lens E1, a second lens E2, a third lens E3, a fourth lens E4, a fifth lens E5, an optical filter E6 and an imaging plane S13.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a concave surface, and an image-side surface S6 thereof is a convex surface. The fourth lens E4 has positive refractive power, an object-side surface S7 thereof is a convex surface, and an image-side surface S8 thereof is a convex surface. The fifth lens E5 has negative refractive power, an object-side surface S9 thereof is a concave surface, and an image-side surface S10 thereof is a concave surface. The optical filter E6 has an object-side surface S11 and an image-side surface S12. Light from an object sequentially passes through the respective surfaces S1 to S12 and is finally imaged on the imaging plane S13.

The optical imaging lens assembly of the present embodiment may further include a stop STO disposed between the object side and the first lens E1, to improve an imaging quality of the optical imaging lens assembly.

Table 1 shows surface type, radius of curvature, thickness, material and conic coefficient of each lens of the optical imaging lens assembly in embodiment 1, wherein the units for the radius of curvature and the thickness are millimeter (mm).

TABLE 1

| Surface number | Surface type | Radius of curvature | Thickness | Material Refractive index | Abbe number | Conic coefficient |
|---|---|---|---|---|---|---|
| OBJ | spherical | infinite | infinite | | | |
| STO | spherical | infinite | −0.3784 | | | |
| S1 | aspheric | 2.0348 | 0.6638 | 1.55 | 56.1 | −0.1992 |
| S2 | aspheric | 9.8057 | 0.1729 | | | 17.3022 |
| S3 | aspheric | 13.4651 | 0.2785 | 1.67 | 19.2 | 83.5117 |
| S4 | aspheric | 4.2040 | 0.4639 | | | 8.1278 |
| S5 | aspheric | −19.9749 | 0.5957 | 1.57 | 38.0 | 13.4232 |
| S6 | aspheric | −6.3365 | 0.9818 | | | 4.9735 |
| S7 | aspheric | 21.1756 | 0.7337 | 1.55 | 56.1 | −77.5556 |
| S8 | aspheric | −3.9556 | 0.8252 | | | −1.0224 |
| S9 | aspheric | −77.5278 | 0.4000 | 1.54 | 55.9 | −99.0000 |
| S10 | aspheric | 1.9000 | 0.3865 | | | −6.5650 |
| S11 | spherical | infinite | 0.2963 | 1.52 | 64.2 | |
| S12 | spherical | infinite | 0.3417 | | | |
| S13 | spherical | infinite | | | | |

As can been seen in Table 1, the object-side surface and the image-side surface of any one of the first lens E1 to the fifth lens E5 are aspheric. In the present embodiment, the surface shape x of each aspheric lens can be defined by using, but not limited to, the following aspheric formula:

$$x = \frac{ch^2}{1+\sqrt{1-(k+1)c^2h^2}} + \sum A_i h^i \quad (1)$$

Where, x is the sag, i.e., the axis-component of the displacement of the aspheric surface from the aspheric vertex, when the aspheric surface is at height h from the optical axis; c is the paraxial curvature of the aspheric surface, c=1/R (that is, the paraxial curvature c is reciprocal of the radius of curvature R in the above Table 1); k is the conic coefficient (given in Table 1); Ai is a correction coefficient for the i-th order of the aspheric surface. Table 2 shows high-order coefficients $A_4$, $A_6$, $A_8$, $A_{10}$, $A_{12}$, $A_{14}$, $A_{16}$, $A_{18}$ and $A_{20}$ applicable to each aspheric surface S1-S10 in embodiment 1.

TABLE 2

| Surface number | A4 | A6 | A8 | A10 | A12 |
|---|---|---|---|---|---|
| S1 | 4.3347E−03 | 1.0409E−03 | 9.0835E−03 | −3.4351E−02 | 6.4565E−02 |
| S2 | −2.9093E−02 | 2.3320E−02 | −4.1072E−02 | 1.1577E−01 | −2.3430E−01 |
| S3 | −5.2178E−02 | 5.4735E−02 | −1.2462E−02 | −2.0855E−02 | 2.1196E−02 |
| S4 | −3.5729E−02 | 5.1931E−02 | −3.4797E−02 | 7.3969E−02 | −1.8357E−01 |
| S5 | −5.4262E−02 | −6.9274E−03 | 1.0003E−02 | −3.3697E−02 | 6.0402E−02 |
| S6 | −4.0435E−02 | −2.1076E−02 | 5.3382E−02 | −1.0773E−01 | 1.3499E−01 |
| S7 | −3.4338E−03 | −1.3222E−02 | 5.9929E−03 | −3.5083E−03 | 1.7825E−03 |
| S8 | 2.0320E−02 | −1.8773E−02 | 8.7918E−03 | −3.1953E−03 | 9.8307E−04 |
| S9 | −1.3070E−01 | 3.5947E−02 | −2.4484E−03 | −5.7466E−04 | 1.4968E−04 |
| S10 | −6.0532E−02 | 1.8811E−02 | −3.7484E−03 | 5.2813E−04 | −5.3803E−05 |

| Surface number | A14 | A16 | A18 | A20 |
|---|---|---|---|---|
| S1 | −6.8834E−02 | 4.1847E−02 | −1.3504E−02 | 1.7706E−03 |
| S2 | 2.9251E−01 | −2.1864E−01 | 8.9755E−02 | −1.5587E−02 |
| S3 | 2.3345E−03 | −1.7158E−02 | 1.2069E−02 | −2.9433E−03 |
| S4 | 2.7000E−01 | −2.2490E−01 | 1.0096E−01 | −1.8870E−02 |
| S5 | −8.6183E−02 | 8.3171E−02 | −4.5932E−02 | 1.1079E−02 |
| S6 | −1.0796E−01 | 5.3296E−02 | −1.4843E−02 | 1.7981E−03 |
| S7 | −6.5233E−04 | 1.4734E−04 | −1.7436E−05 | 8.2029E−07 |
| S8 | −2.1436E−04 | 2.8950E−05 | −2.1455E−06 | 6.6591E−08 |
| S9 | −1.5705E−05 | 8.9021E−07 | −2.6745E−08 | 3.3407E−10 |
| S10 | 3.8446E−06 | −1.8187E−07 | 5.1012E−09 | −6.3914E−11 |

Table 3 shows effective focal lengths f1 to f5 of the lenses, a total effective focal length f, a total optical length TTL (i.e., a distance along the optical axis from the object-side surface S1 of the first lens E1 to the imaging plane S13), half of a diagonal length ImgH of an effective pixel area on the imaging plane S13, half of a maximal field-of-view angle Semi-FOV, and a ratio of the total effective focal length f to an entrance pupil diameter EPD of the optical imaging lens assembly in embodiment 1.

TABLE 3

| | | | |
|---|---|---|---|
| f1(mm) | 4.57 | f(mm) | 5.04 |
| f2(mm) | −9.13 | TTL(mm) | 6.14 |
| f3(mm) | 16.02 | ImgH(mm) | 4.75 |
| f4(mm) | 6.17 | Semi-FOV(°) | 42.2 |
| f5(mm) | −3.45 | f/EPD | 2.02 |

Figure 2D:
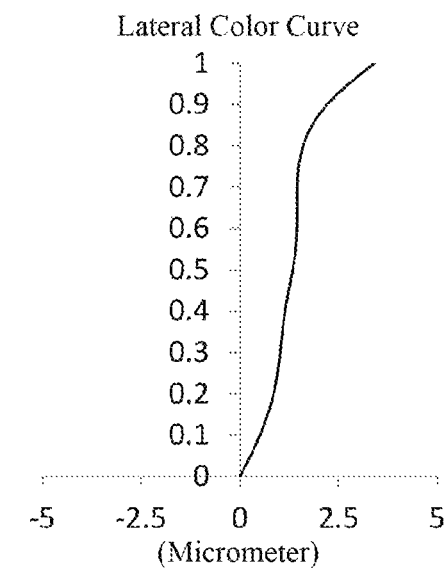

FIG. 2A illustrates a longitudinal aberration curve of the optical imaging lens assembly according to embodiment 1, representing deviations of focal points focused by light of different wavelengths after passing through the optical imaging lens assembly. FIG. 2B illustrates an astigmatic curve of the optical imaging lens assembly according to embodiment 1, representing a curvature of a tangential plane and a curvature of a sagittal plane. FIG. 2C illustrates a distortion curve of the optical imaging lens assembly according to embodiment 1, representing amounts of distortion corresponding to different image heights. FIG. 2D illustrates a lateral color curve of the optical imaging lens assembly according to embodiment 1, representing deviations of different image heights on an imaging plane after the light passes through the optical imaging lens assembly. It can be seen from FIG. 2A to FIG. 2D that the optical imaging lens assembly provided in embodiment 1 can achieve good image quality.

Embodiment 2

Figure 3:
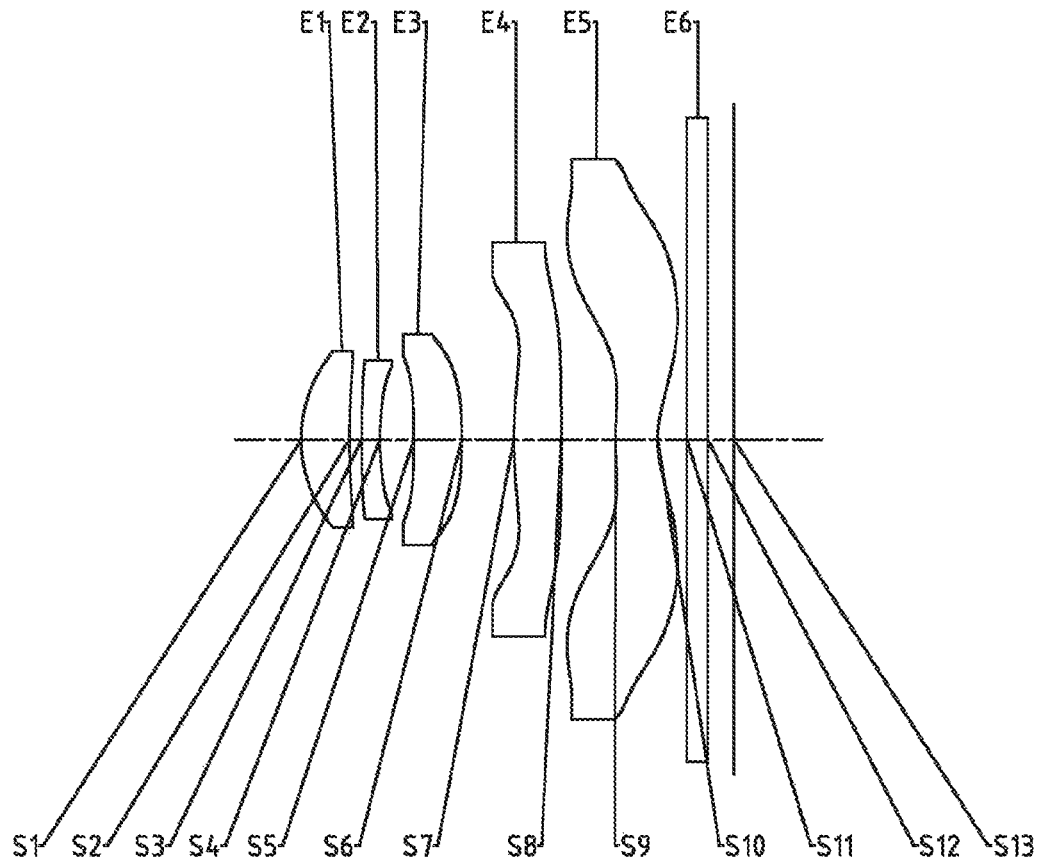
FIG. 3 is a schematic structural view of an optical imaging lens assembly according to embodiment 2 of the present disclosure.

An optical imaging lens assembly according to embodiment 2 of the present disclosure is described below with reference to FIG. 3 to FIG. 4D. In this embodiment and the following embodiments, for the purpose of brevity, the description of parts similar to those in embodiment 1 will be omitted. FIG. 3 is a schematic structural view of the optical imaging lens assembly according to embodiment 2 of the present disclosure.

As shown in FIG. 3, the optical imaging lens assembly according to an exemplary implementation of the present disclosure includes, sequentially from an object side to an image side along an optical axis: a first lens E1, a second lens E2, a third lens E3, a fourth lens E4, a fifth lens E5, an optical filter E6 and an imaging plane S13.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a concave surface, and an image-side surface S6 thereof is a convex surface. The fourth lens E4 has positive refractive power, an object-side surface S7 thereof is a convex surface, and an image-side surface S8 thereof is a convex surface. The fifth lens E5 has negative refractive power, an object-side surface S9 thereof is a convex surface, and an image-side surface S10 thereof is a concave surface. The optical filter E6 has an object-side surface S11 and an image-side surface S12. Light from an object sequentially passes through the respective surfaces S1 to S12 and is finally imaged on the imaging plane S13.

The optical imaging lens assembly of the present embodiment may further include a stop STO disposed between the object side and the first lens E1, to improve an imaging quality of the optical imaging lens assembly.

Table 4 shows surface type, radius of curvature, thickness, material and conic coefficient of each lens of the optical imaging lens assembly in embodiment 2, wherein the units for the radius of curvature and the thickness are millimeter (mm). Table 5 shows high-order coefficients applicable to each aspheric surface in embodiment 2, wherein the surface type of each aspheric surface may be defined by the formula (1) given above in embodiment 1. Table 6 shows effective focal lengths f1 to f5 of the lenses, a total effective focal length f, a total optical length TTL, half of a diagonal length ImgH of an effective pixel area on the imaging plane S13, half of a maximal field-of-view angle Semi-FOV, and a ratio of the total effective focal length f to an entrance pupil diameter EPD of the optical imaging lens assembly in embodiment 2.

TABLE 4

| Surface number | Surface type | Radius of curvature | Thickness | Material Refractive index | Abbe number | Conic coefficient |
|---|---|---|---|---|---|---|
| OBJ | spherical | infinite | infinite | | | |
| STO | spherical | infinite | −0.4072 | | | |
| S1 | aspheric | 1.9703 | 0.6823 | 1.55 | 56.1 | −0.2000 |
| S2 | aspheric | 8.6229 | 0.1736 | | | 10.7030 |
| S3 | aspheric | 10.8217 | 0.2605 | 1.67 | 19.2 | 61.0700 |
| S4 | aspheric | 4.0504 | 0.4823 | | | 8.2349 |
| S5 | aspheric | −17.4661 | 0.6800 | 1.57 | 38.0 | −98.3446 |
| S6 | aspheric | −6.8900 | 0.7382 | | | 7.7142 |
| S7 | aspheric | 6.3876 | 0.6728 | 1.55 | 56.1 | −37.5509 |
| S8 | aspheric | −50.0000 | 0.7697 | | | 99.0000 |
| S9 | aspheric | 4.5797 | 0.5992 | 1.54 | 55.9 | −49.2259 |
| S10 | aspheric | 1.5844 | 0.4150 | | | −5.7775 |
| S11 | spherical | infinite | 0.2963 | 1.52 | 64.2 | |
| S12 | spherical | infinite | 0.3701 | | | |
| S13 | spherical | infinite | | | | |

TABLE 5

| Surface number | A4 | A6 | A8 | A10 | A12 |
|---|---|---|---|---|---|
| S1 | 4.0314E−03 | 4.9948E−03 | −7.2441E−03 | 6.3534E−03 | 1.7771E−03 |
| S2 | −3.3198E−02 | 2.4065E−02 | −4.0168E−02 | 1.1761E−01 | −2.4163E−01 |
| S3 | −6.3433E−02 | 6.4056E−02 | −2.6179E−02 | 2.8603E−02 | −8.3577E−02 |
| S4 | −4.3058E−02 | 7.0605E−02 | −1.0560E−01 | 3.3829E−01 | −7.7148E−01 |

TABLE 5-continued

| | | | | | |
|---|---|---|---|---|---|
| S5 | −5.7711E−02 | −5.5868E−04 | −8.4834E−03 | 4.8575E−02 | −1.3248E−01 |
| S6 | −4.8875E−02 | −1.7561E−02 | 5.8957E−02 | −1.1885E−01 | 1.4475E−01 |
| S7 | 7.2775E−03 | −1.9088E−02 | 1.2562E−02 | −8.4880E−03 | 3.6905E−03 |
| S8 | −6.4473E−04 | 7.3197E−04 | −5.4834E−04 | −6.2016E−04 | 4.0596E−04 |
| S9 | −1.1327E−01 | 2.4988E−02 | −1.0622E−03 | −4.3049E−04 | 9.6034E−05 |
| S10 | −5.4497E−02 | 1.6098E−02 | −3.6196E−03 | 5.7163E−04 | −5.9070E−05 |

| Surface number | A14 | A16 | A18 | A20 |
|---|---|---|---|---|
| S1 | −8.6313E−03 | 6.9490E−03 | −2.3160E−03 | 2.4551E−04 |
| S2 | 3.0093E−01 | −2.2232E−01 | 8.9694E−02 | −1.5266E−02 |
| S3 | 1.2647E−01 | −1.0233E−01 | 4.3724E−02 | −7.9149E−03 |
| S4 | 1.0624E+00 | −8.6391E−01 | 3.8528E−01 | −7.2706E−02 |
| S5 | 1.7869E−01 | −1.2867E−01 | 4.6914E−02 | −6.2578E−03 |
| S6 | −1.0945E−01 | 5.0163E−02 | −1.2773E−02 | 1.3974E−03 |
| S7 | −1.0080E−03 | 1.7011E−04 | −1.5899E−05 | 6.2023E−07 |
| S8 | −9.8624E−05 | 1.2274E−05 | −7.8911E−07 | 2.0945E−08 |
| S9 | −1.0016E−05 | 6.0569E−07 | −2.0491E−08 | 3.0106E−10 |
| S10 | 3.6335E−06 | −1.1321E−07 | 9.9332E−10 | 1.5761E−11 |

TABLE 6

| | | | |
|---|---|---|---|
| f1(mm) | 4.51 | f(mm) | 5.08 |
| f2(mm) | −9.70 | TTL(mm) | 6.14 |
| f3(mm) | 19.49 | ImgH(mm) | 4.73 |
| f4(mm) | 10.42 | Semi-FOV(°) | 41.9 |
| f5(mm) | −4.85 | f/EPD | 2.03 |

Figure 4A:
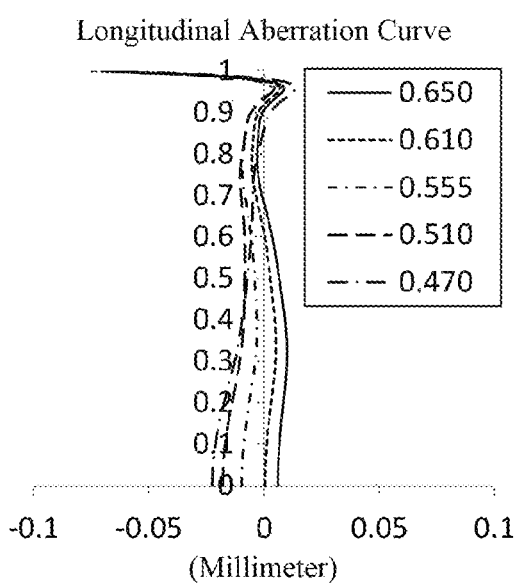
FIGS. 4A-4D illustrate a longitudinal aberration curve, an astigmatic curve, a distortion curve and a lateral color curve of the optical imaging lens assembly according to embodiment 2, respectively.
Figure 4B:
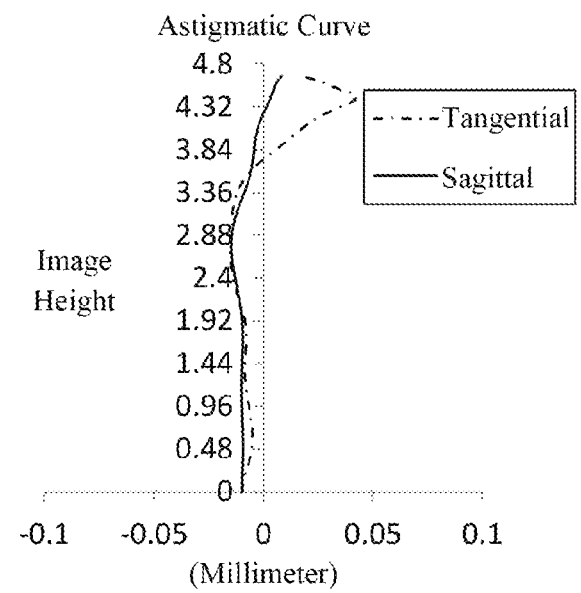
Figure 4C:
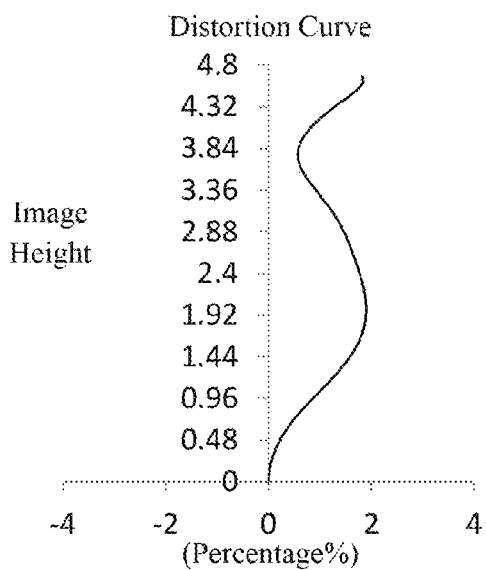
Figure 4D:
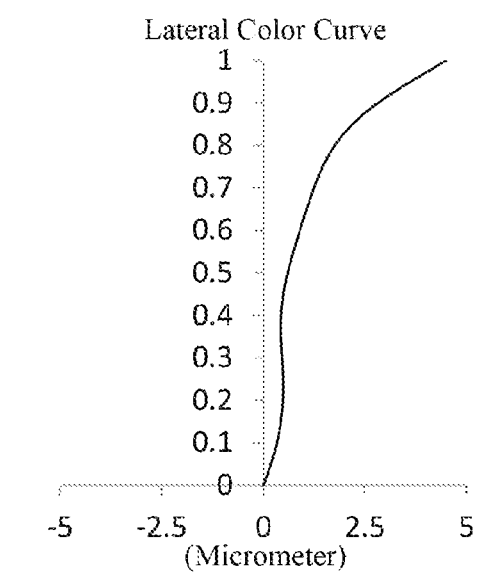

FIG. 4A illustrates a longitudinal aberration curve of the optical imaging lens assembly according to embodiment 2, representing deviations of focal points focused by light of different wavelengths after passing through the optical imaging lens assembly. FIG. 4B illustrates an astigmatic curve of the optical imaging lens assembly according to embodiment 2, representing a curvature of a tangential plane and a curvature of a sagittal plane. FIG. 4C illustrates a distortion curve of the optical imaging lens assembly according to embodiment 2, representing amounts of distortion corresponding to different image heights. FIG. 4D illustrates a lateral color curve of the optical imaging lens assembly according to embodiment 2, representing deviations of different image heights on an imaging plane after the light passes through the optical imaging lens assembly. It can be seen from FIG. 4A to FIG. 4D that the optical imaging lens assembly provided in embodiment 2 can achieve good image quality.

Embodiment 3

Figure 5:
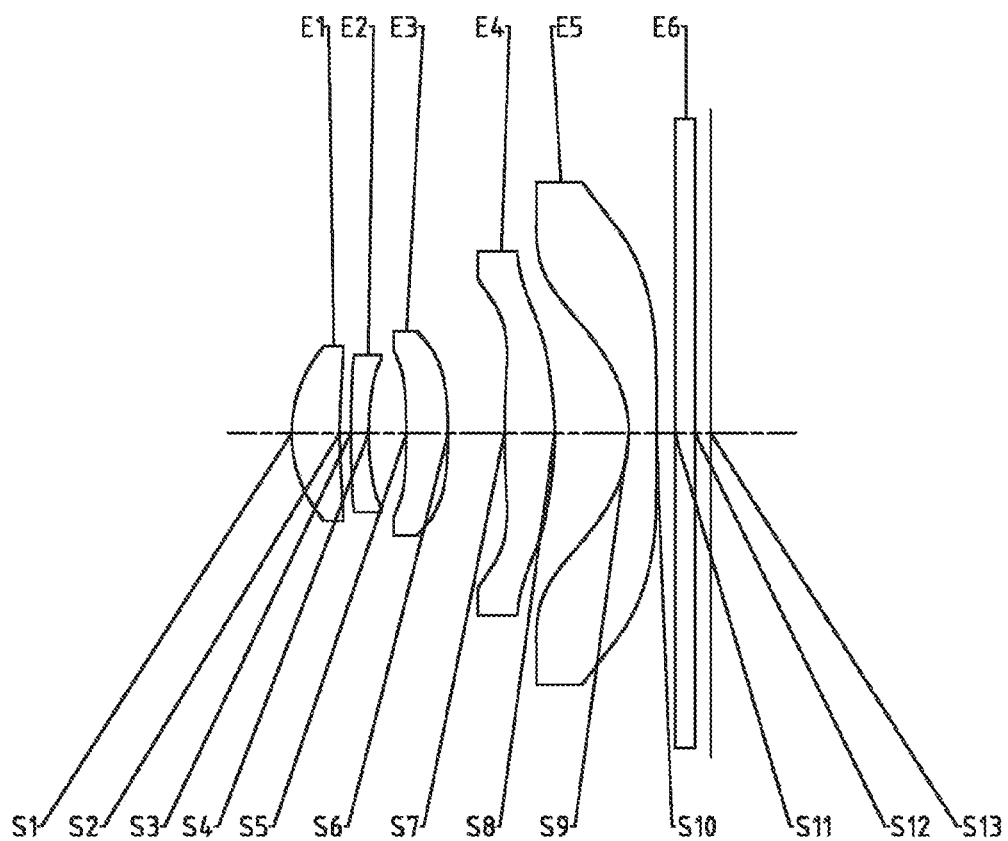
FIG. 5 is a schematic structural view of an optical imaging lens assembly according to embodiment 3 of the present disclosure.

An optical imaging lens assembly according to embodiment 3 of the present disclosure is described below with reference to FIG. 5 to FIG. 6D. FIG. 5 is a schematic structural view of the optical imaging lens assembly according to embodiment 3 of the present disclosure.

As shown in FIG. 5, the optical imaging lens assembly according to an exemplary implementation of the present disclosure includes, sequentially from an object side to an image side along an optical axis: a first lens E1, a second lens E2, a third lens E3, a fourth lens E4, a fifth lens E5, an optical filter E6 and an imaging plane S13.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a concave surface, and an image-side surface S6 thereof is a convex surface. The fourth lens E4 has positive refractive power, an object-side surface S7 thereof is a convex surface, and an image-side surface S8 thereof is a convex surface. The fifth lens E5 has negative refractive power, an object-side surface S9 thereof is a concave surface, and an image-side surface S10 thereof is a convex surface. The optical filter E6 has an object-side surface S11 and an image-side surface S12. Light from an object sequentially passes through the respective surfaces S1 to S12 and is finally imaged on the imaging plane S13.

The optical imaging lens assembly of the present embodiment may further include a stop STO disposed between the object side and the first lens E1, to improve an imaging quality of the optical imaging lens assembly.

Table 7 shows surface type, radius of curvature, thickness, material and conic coefficient of each lens of the optical imaging lens assembly in embodiment 3, wherein the units for the radius of curvature and the thickness are millimeter (mm). Table 8 shows high-order coefficients applicable to each aspheric surface in embodiment 3, wherein the surface type of each aspheric surface may be defined by the formula (1) given above in embodiment 1. Table 9 shows effective focal lengths f1 to f5 of the lenses, a total effective focal length f, a total optical length TTL, half of a diagonal length ImgH of an effective pixel area on the imaging plane S13, half of a maximal field-of-view angle Semi-FOV, and a ratio of the total effective focal length f to an entrance pupil diameter EPD of the optical imaging lens assembly in embodiment 3.

TABLE 7

| Surface number | Surface type | Radius of curvature | Thickness | Material Refractive index | Abbe number | Conic coefficient |
|---|---|---|---|---|---|---|
| OBJ | spherical | infinite | infinite | | | |
| STO | spherical | infinite | −0.4243 | | | |
| S1 | aspheric | 1.9925 | 0.7035 | 1.55 | 56.1 | −0.1666 |
| S2 | aspheric | 8.7275 | 0.1608 | | | 11.5647 |
| S3 | aspheric | 10.8999 | 0.2630 | 1.67 | 19.2 | 60.4234 |
| S4 | aspheric | 4.1341 | 0.5505 | | | 8.2079 |
| S5 | aspheric | −16.9244 | 0.6135 | 1.57 | 38.0 | 99.0000 |
| S6 | aspheric | −7.2243 | 0.8240 | | | 16.5401 |
| S7 | aspheric | 9.7352 | 0.7344 | 1.55 | 56.1 | −54.3418 |
| S8 | aspheric | −5.2667 | 1.0895 | | | −0.4080 |
| S9 | aspheric | −1.7560 | 0.4000 | 1.54 | 55.9 | −6.5322 |
| S10 | aspheric | −589.7109 | 0.2747 | | | −99.0000 |
| S11 | spherical | infinite | 0.2963 | 1.52 | 64.2 | |
| S12 | spherical | infinite | 0.2299 | | | |
| S13 | spherical | infinite | | | | |

TABLE 8

| Surface number | A4 | A6 | A8 | A10 | A12 |
|---|---|---|---|---|---|
| S1 | 4.2634E−03 | 4.3203E−03 | −6.7179E−03 | 1.1058E−02 | −1.1084E−02 |
| S2 | −3.2952E−02 | 2.1367E−02 | −1.6887E−02 | 3.0235E−02 | −5.7685E−02 |
| S3 | −6.1090E−02 | 5.3677E−02 | 5.6781E−03 | −7.7984E−02 | 1.4150E−01 |
| S4 | −3.7403E−02 | 5.3245E−02 | −4.7809E−02 | 1.6208E−01 | −4.2082E−01 |
| S5 | −5.5091E−02 | 5.7193E−03 | −2.8144E−02 | 6.3125E−02 | −1.0533E−01 |
| S6 | −4.5913E−02 | −1.1094E−02 | 4.3449E−02 | −9.7687E−02 | 1.2504E−01 |
| S7 | −5.2874E−03 | −7.4750E−03 | 6.8537E−03 | −7.0533E−03 | 3.6809E−03 |
| S8 | 1.1685E−02 | −9.2207E−03 | 7.9943E−03 | 5.9421E−03 | 2.3824E−03 |
| S9 | −8.7255E−02 | 3.7498E−02 | −1.5020E−02 | 4.6126E−03 | −8.6859E−04 |
| S10 | 9.9166E−03 | −1.3672E−02 | 4.9745E−03 | −1.0888E−03 | 1.5902E−04 |

| Surface number | A14 | A16 | A18 | A20 |
|---|---|---|---|---|
| S1 | 7.2856E−03 | −3.5303E−03 | 1.2177E−03 | −2.2342E−04 |
| S2 | 7.2238E−02 | −5.5387E−02 | 2.3496E−02 | −4.2289E−03 |
| S3 | −1.5966E−01 | 1.1304E−01 | −4.4835E−02 | 7.4838E−03 |
| S4 | 6.1975E−01 | −5.1928E−01 | 2.3371E−01 | −4.3813E−02 |
| S5 | 1.0126E−01 | −5.1896E−02 | 1.0869E−02 | 2.6386E−04 |
| S6 | −9.7741E−02 | 4.5980E−02 | −1.2002E−02 | 1.3458E−03 |
| S7 | −1.0805E−03 | 1.8294E−04 | −1.6534E−05 | 6.1629E−07 |
| S8 | −5.2122E−04 | 6.4028E−05 | −4.1890E−06 | 1.1436E−07 |
| S9 | 9.8214E−05 | −6.5687E−06 | 2.4030E−07 | −3.7100E−09 |
| S10 | −1.5697E−05 | 9.9399E−07 | −3.5839E−08 | 5.5252E−10 |

TABLE 9

| | | | |
|---|---|---|---|
| f1(mm) | 4.56 | f(mm) | 5.19 |
| f2(mm) | −9.99 | TTL(mm) | 6.14 |
| f3(mm) | 21.60 | ImgH(mm) | 4.66 |
| f4(mm) | 6.37 | Semi-FOV(°) | 40.8 |
| f5(mm) | −3.28 | f/EPD | 2.02 |

Figures 6A, 6B:
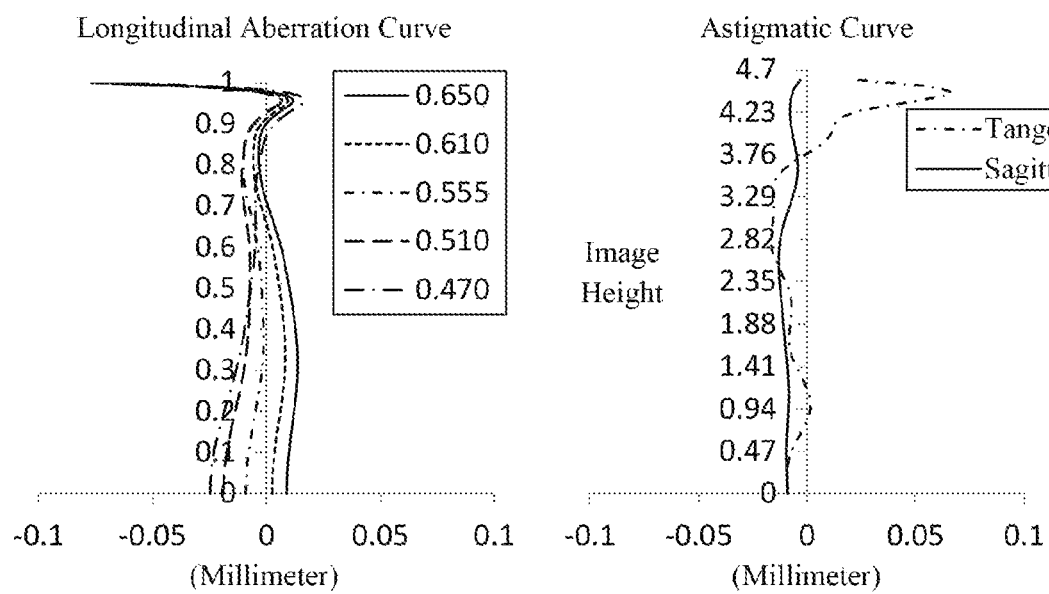
FIGS. 6A-6D illustrate a longitudinal aberration curve, an astigmatic curve, a distortion curve and a lateral color curve of the optical imaging lens assembly according to embodiment 3, respectively.
Figure 6C:
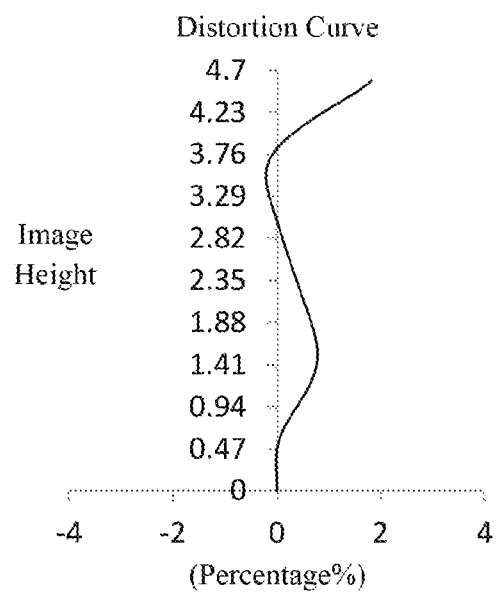
Figure 6D:
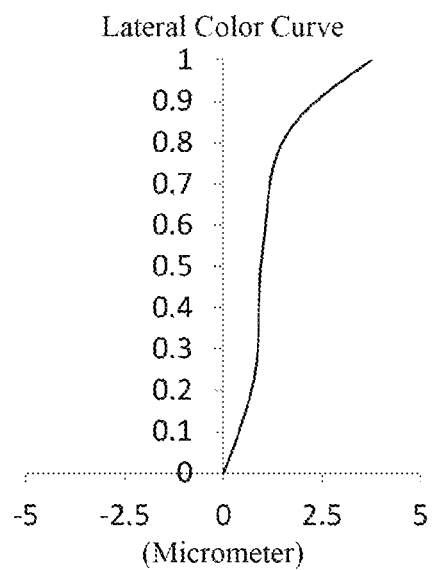

FIG. 6A illustrates a longitudinal aberration curve of the optical imaging lens assembly according to embodiment 3, representing deviations of focal points focused by light of different wavelengths after passing through the optical imaging lens assembly. FIG. 6B illustrates an astigmatic curve of the optical imaging lens assembly according to embodiment 3, representing a curvature of a tangential plane and a curvature of a sagittal plane. FIG. 6C illustrates a distortion curve of the optical imaging lens assembly according to embodiment 3, representing amounts of distortion corresponding to different image heights. FIG. 6D illustrates a lateral color curve of the optical imaging lens assembly according to different image heights on an imaging plane after the light passes through the optical imaging lens assembly. It can be seen from FIG. 6A to FIG. 6D that the optical imaging lens assembly provided in embodiment 3 can achieve good image quality.

Embodiment 4

Figure 7:
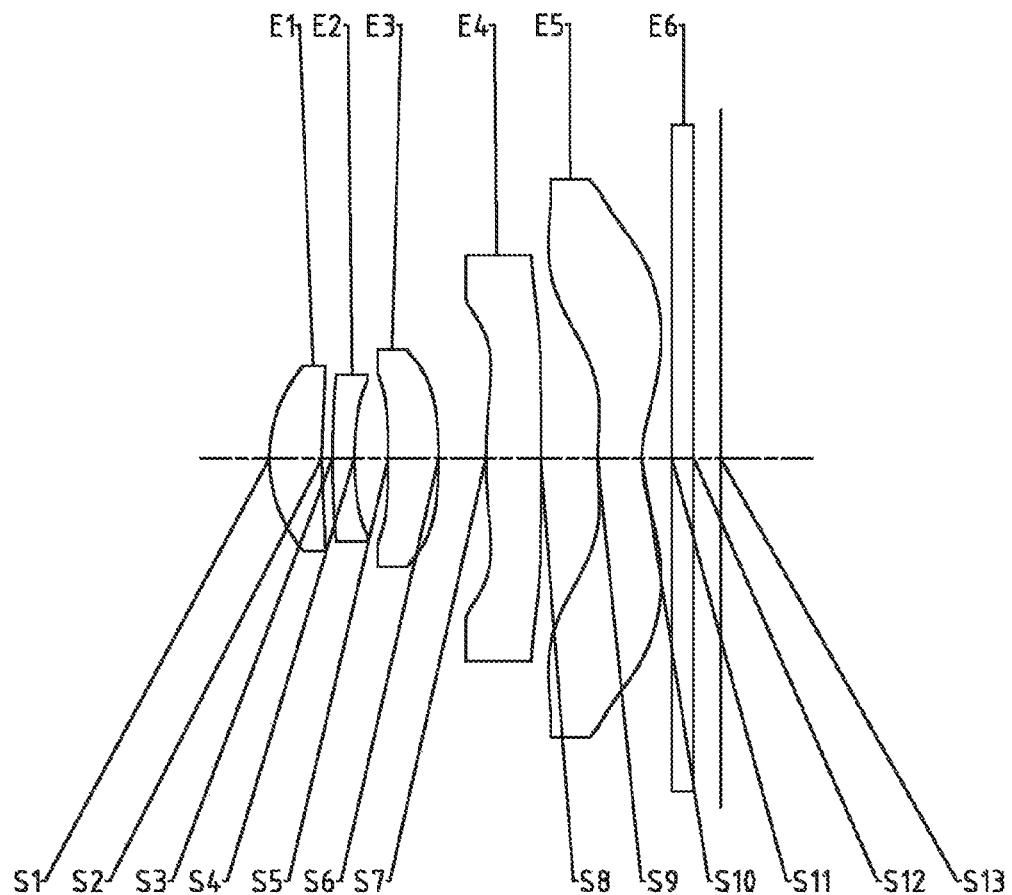
FIG. 7 is a schematic structural view of an optical imaging lens assembly according to embodiment 4 of the present disclosure.

An optical imaging lens assembly according to embodiment 4 of the present disclosure is described below with reference to FIG. 7 to FIG. 8D. FIG. 7 is a schematic structural view of the optical imaging lens assembly according to embodiment 4 of the present disclosure.

As shown in FIG. 7, the optical imaging lens assembly according to an exemplary implementation of the present disclosure includes, sequentially from an object side to an image side along an optical axis: a first lens E1, a second lens E2, a third lens E3, a fourth lens E4, a fifth lens E5, an optical filter E6 and an imaging plane S13.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a concave surface, and an image-side surface S6 thereof is a convex surface. The fourth lens E4 has positive refractive power, an object-side surface S7 thereof is a convex surface, and an image-side surface S8 thereof is a concave surface. The fifth lens E5 has negative refractive power, an object-side surface S9 thereof is a convex surface, and an image-side surface S10 thereof is a concave surface. The optical filter E6 has an object-side surface S11 and an image-side surface S12. Light from an object sequentially passes through the respective surfaces S1 to S12 and is finally imaged on the imaging plane S13.

The optical imaging lens assembly of the present embodiment may further include a stop STO disposed between the object side and the first lens E1, to improve an imaging quality of the optical imaging lens assembly.

Table 10 shows surface type, radius of curvature, thickness, material and conic coefficient of each lens of the optical imaging lens assembly in embodiment 4, wherein the units for the radius of curvature and the thickness are millimeter (mm). Table 11 shows high-order coefficients applicable to each aspheric surface in embodiment 4, wherein the surface type of each aspheric surface may be defined by the formula (1) given above in embodiment 1. Table 12 shows effective focal lengths f1 to f5 of the lenses, a total effective focal length f, a total optical length TTL, half of a diagonal length ImgH of an effective pixel area on the imaging plane S13, half of a maximal field-of-view angle Semi-FOV, and a ratio of the total effective focal length f to an entrance pupil diameter EPD of the optical imaging lens assembly in embodiment 4.

TABLE 10

| Surface number | Surface type | Radius of curvature | Thickness | Material Refractive index | Abbe number | Conic coefficient |
|---|---|---|---|---|---|---|
| OBJ | spherical | infinite | infinite | | | |
| STO | spherical | infinite | −0.4458 | | | |
| S1 | aspheric | 1.9498 | 0.7148 | 1.55 | 56.1 | −0.2421 |
| S2 | aspheric | 8.2074 | 0.1433 | | | 1.6307 |
| S3 | aspheric | 9.9354 | 0.2980 | 1.67 | 19.2 | 54.6708 |
| S4 | aspheric | 3.9770 | 0.4603 | | | 8.3360 |
| S5 | aspheric | −18.5039 | 0.6850 | 1.57 | 38.0 | −97.3288 |
| S6 | aspheric | −7.5622 | 0.6441 | | | 12.9965 |
| S7 | aspheric | 6.0828 | 0.7485 | 1.55 | 56.1 | −46.8038 |
| S8 | aspheric | 875.7136 | 0.7743 | | | −99.0000 |
| S9 | aspheric | 4.4470 | 0.6000 | 1.54 | 55.9 | −45.3320 |
| S10 | aspheric | 1.5623 | 0.4101 | | | −6.3210 |
| S11 | spherical | infinite | 0.2963 | 1.52 | 64.2 | |
| S12 | spherical | infinite | 0.3653 | | | |
| S13 | spherical | infinite | | | | |

TABLE 11

| Surface number | A4 | A6 | A8 | A10 | A12 |
|---|---|---|---|---|---|
| S1 | 3.4872E−03 | 8.5343E−03 | −2.1075E−02 | 3.7530E−02 | −4.3258E−02 |
| S2 | −4.3664E−02 | 3.0848E−02 | −3.3931E−02 | 9.2855E−02 | −1.9822E−01 |
| S3 | −7.1070E−02 | 6.4350E−02 | −4.7786E−03 | −3.4305E−02 | 2.8683E−02 |
| S4 | −4.0933E−02 | 6.1456E−02 | −6.9650E−02 | 2.5299E−01 | −6.4400E−01 |
| S5 | −5.8207E−02 | −1.0036E−02 | 6.0394E−02 | −1.8133E−01 | 3.0597E−01 |
| S6 | −5.3932E−02 | −1.3775E−02 | 6.2168E−02 | −1.4098E−01 | 1.8423E−01 |
| S7 | 7.1191E−03 | −1.8816E−02 | 1.0849E−02 | −7.2176E−03 | 3.1679E−03 |
| S8 | −6.9030E−03 | 9.4508E−03 | −6.3577E−03 | 1.8703E−03 | −2.6768E−04 |
| S9 | −1.2962E−01 | 4.0872E−02 | −8.2904E−03 | 1.4665E−03 | −2.0984E−04 |
| S10 | −5.7281E−02 | 1.7706E−02 | −3.9644E−03 | 5.6058E−04 | −4.3163E−05 |

| Surface number | A14 | A16 | A18 | A20 |
|---|---|---|---|---|
| S1 | 3.2475E−02 | −1.6100E−02 | 4.8563E−03 | −6.9837E−04 |
| S2 | 2.5042E−01 | −1.8533E−01 | 7.4496E−02 | −1.2604E−02 |
| S3 | −5.1876E−03 | −6.4162E−03 | 4.7864E−03 | −1.1998E−03 |
| S4 | 9.4218E−01 | −7.9664E−01 | 3.6589E−01 | −7.0666E−02 |
| S5 | −3.3145E−01 | 2.3104E−01 | −9.5599E−02 | 1.8312E−02 |
| S6 | −1.4678E−01 | 7.0206E−02 | −1.8547E−02 | 2.0894E−03 |
| S7 | −8.5647E−04 | 1.3750E−04 | −1.1391E−05 | 3.4621E−07 |
| S8 | 1.4772E−05 | 6.8538E−07 | −1.2761E−07 | 4.7025E−09 |
| S9 | 2.0765E−05 | −1.2798E−06 | 4.3819E−08 | −6.3446E−10 |
| S10 | 7.5134E−07 | 1.3764E−07 | −9.9537E−09 | 2.0660E−10 |

TABLE 12

| f1(mm) | 4.50 | f(mm) | 5.12 |
|---|---|---|---|
| f2(mm) | −9.99 | TTL(mm) | 6.14 |
| f3(mm) | 21.92 | ImgH(mm) | 4.72 |
| f4(mm) | 11.22 | Semi-FOV(°) | 41.6 |
| f5(mm) | −4.84 | f/EPD | 2.03 |

Figure 8A:
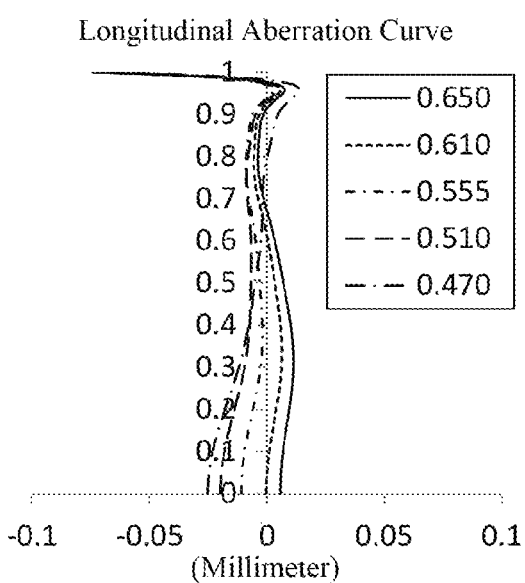
FIGS. 8A-8D illustrate a longitudinal aberration curve, an astigmatic curve, a distortion curve and a lateral color curve of the optical imaging lens assembly according to embodiment 4, respectively.
Figure 8B:
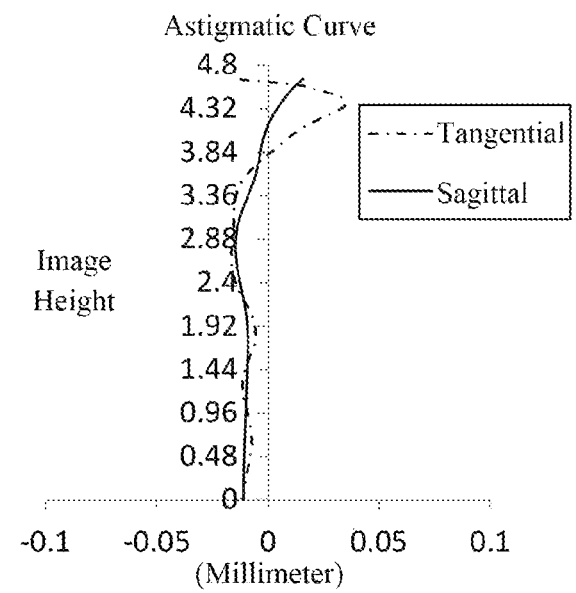
Figure 8C:
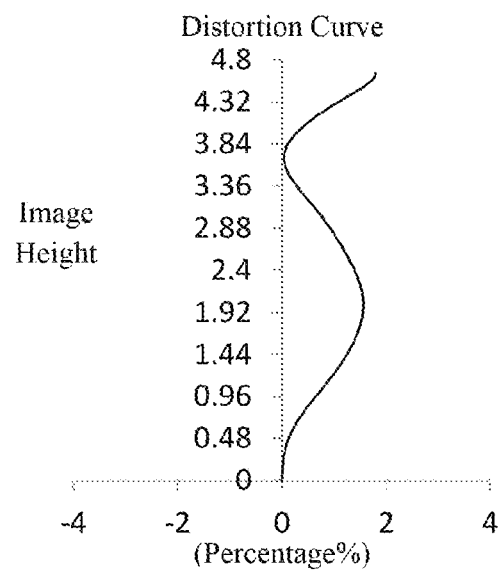
Figure 8D:
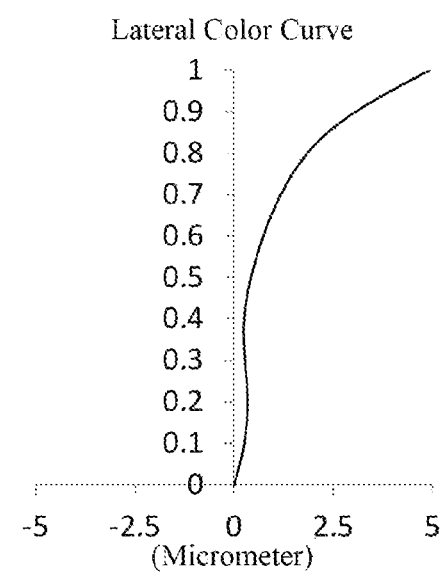

FIG. 8A illustrates a longitudinal aberration curve of the optical imaging lens assembly according to embodiment 4, representing deviations of focal points focused by light of different wavelengths after passing through the optical imaging lens assembly. FIG. 8B illustrates an astigmatic curve of the optical imaging lens assembly according to embodiment 4, representing a curvature of a tangential plane and a curvature of a sagittal plane. FIG. 8C illustrates a distortion curve of the optical imaging lens assembly according to embodiment 4, representing amounts of distortion corresponding to different image heights. FIG. 8D illustrates a lateral color curve of the optical imaging lens assembly according to embodiment 4, representing deviations of different image heights on an imaging plane after the light passes through the optical imaging lens assembly. It can be seen from FIG. 8A to FIG. 8D that the optical imaging lens assembly provided in embodiment 4 can achieve good image quality.

Embodiment 5

Figure 9:
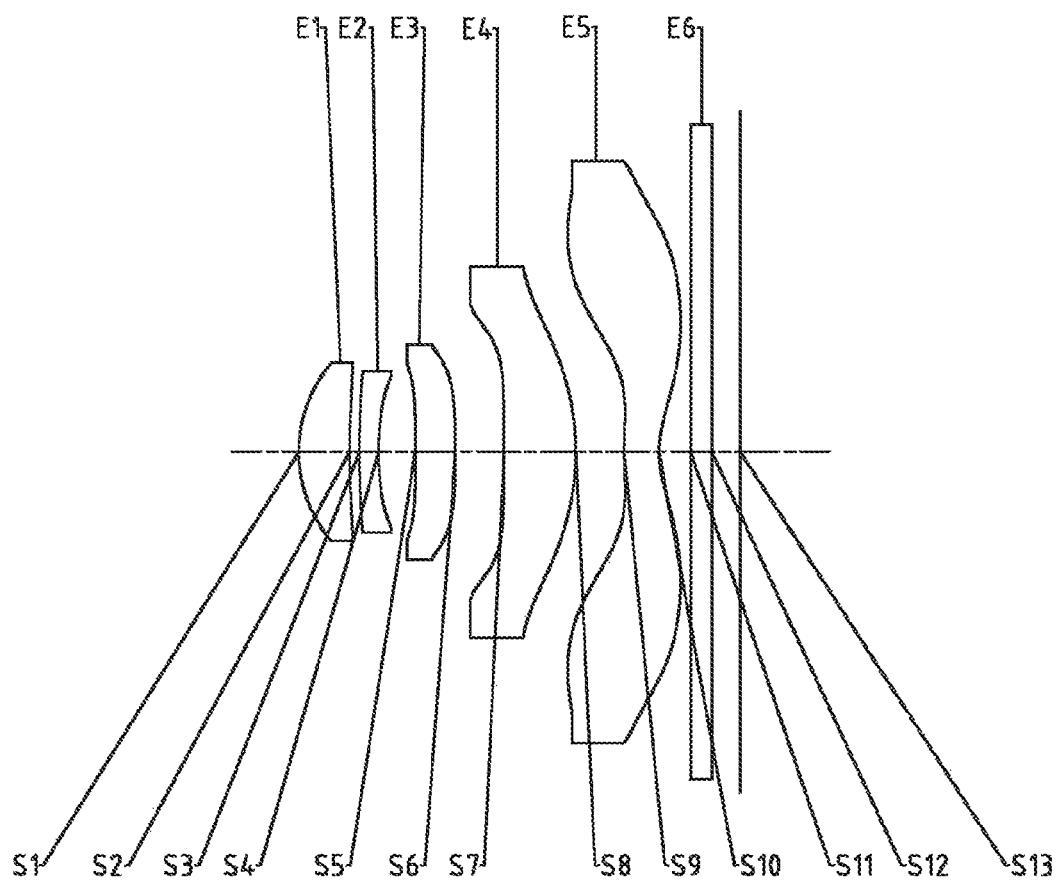
FIG. 9 is a schematic structural view of an optical imaging lens assembly according to embodiment 5 of the present disclosure.

An optical imaging lens assembly according to embodiment 5 of the present disclosure is described below with reference to FIG. 9 to FIG. 10D. FIG. 9 is a schematic structural view of the optical imaging lens assembly according to embodiment 5 of the present disclosure.

As shown in FIG. 9, the optical imaging lens assembly according to an exemplary implementation of the present disclosure includes, sequentially from an object side to an image side along an optical axis: a first lens E1, a second lens E2, a third lens E3, a fourth lens E4, a fifth lens E5, an optical filter E6 and an imaging plane S13.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a convex surface. The fourth lens E4 has positive refractive power, an object-side surface S7 thereof is a concave surface, and an image-side surface S8 thereof is a convex surface. The fifth lens E5 has negative refractive power, an object-side surface S9 thereof is a convex surface, and an image-side surface S10 thereof is a concave surface. The optical filter E6 has an object-side surface S11 and an image-side surface S12. Light from an object sequentially passes through the respective surfaces S1 to S12 and is finally imaged on the imaging plane S13.

The optical imaging lens assembly of the present embodiment may further include a stop STO disposed between the object side and the first lens E1, to improve an imaging quality of the optical imaging lens assembly.

Table 13 shows surface type, radius of curvature, thickness, material and conic coefficient of each lens of the optical imaging lens assembly in embodiment 5, wherein the units for the radius of curvature and the thickness are millimeter (mm). Table 14 shows high-order coefficients applicable to each aspheric surface in embodiment 5, wherein the surface type of each aspheric surface may be defined by the formula (1) given above in embodiment 1. Table 15 shows effective focal lengths f1 to f5 of the lenses, a total effective focal length f, a total optical length TTL, half of a diagonal length ImgH of an effective pixel area on the imaging plane S13, half of a maximal field-of-view angle Semi-FOV, and a ratio of the total effective focal length f to an entrance pupil diameter EPD of the optical imaging lens assembly in embodiment 5.

TABLE 13

| Surface number | Surface type | Radius of curvature | Thickness | Material Refractive index | Material Abbe number | Conic coefficient |
|---|---|---|---|---|---|---|
| OBJ | spherical | infinite | infinite | | | |
| STO | spherical | infinite | −0.3992 | | | |
| S1 | aspheric | 1.9417 | 0.7045 | 1.55 | 56.1 | −0.2168 |
| S2 | aspheric | 8.1526 | 0.1379 | | | 3.2767 |
| S3 | aspheric | 9.7429 | 0.2672 | 1.67 | 19.2 | 53.6167 |
| S4 | aspheric | 3.9930 | 0.5098 | | | 8.2787 |
| S5 | aspheric | 56.3343 | 0.5592 | 1.57 | 38.0 | −99.0000 |
| S6 | aspheric | −20.0000 | 0.6757 | | | 54.8777 |
| S7 | aspheric | −165.3525 | 1.0000 | 1.55 | 56.1 | 99.0000 |
| S8 | aspheric | −3.3625 | 0.6699 | | | −1.3785 |
| S9 | aspheric | 5.2168 | 0.4849 | 1.54 | 55.9 | −93.8231 |
| S10 | aspheric | 1.4217 | 0.4397 | | | −5.7775 |
| S11 | spherical | infinite | 0.2963 | 1.52 | 64.2 | |
| S12 | spherical | infinite | 0.3949 | | | |
| S13 | spherical | infinite | | | | |

TABLE 14

| Surface number | A4 | A6 | A8 | A10 | A12 | A14 | A16 | A18 | A20 |
|---|---|---|---|---|---|---|---|---|---|
| S1 | 4.8417E−03 | 4.0885E−03 | −6.4615E−03 | 8.9314E−03 | −6.2251E−03 | 3.3179E−04 | 1.8833E−03 | −9.5247E−04 | 1.0824E−04 |
| S2 | −4.2010E−02 | 3.4517E−02 | −5.0821E−02 | 1.2568E−01 | −2.3750E−01 | 2.8120E−01 | −2.0193E−01 | 8.0466E−02 | −1.3685E−02 |
| S3 | −7.1793E−02 | 6.9641E−02 | −3.4550E−02 | 8.3607E−02 | 2.5686E−01 | 4.0145E−01 | −3.4105E−01 | 1.5222E−01 | −2.8121E−02 |
| S4 | −4.2004E−02 | 6.2540E−02 | −5.6253E−02 | 1.8570E−01 | −4.8658E−01 | 7.2236E−01 | −6.0901E−01 | 2.7541E−01 | −5.1949E−02 |
| S5 | −5.2730E−02 | 1.2419E−02 | −8.1463E−02 | 2.4089E−01 | −4.2449E−01 | 4.4403E−01 | −2.7311E−01 | 9.0717E−02 | −1.2245E−02 |
| S6 | −4.0814E−02 | −2.0535E−02 | 4.0921E−02 | −7.5616E−02 | 8.9960E−02 | −6.9193E−02 | 3.2895E−02 | −8.7969E−03 | 1.0245E−03 |
| S7 | 1.2291E−03 | −3.2686E−02 | 3.7157E−02 | −3.4469E−02 | 2.0796E−02 | −8.0260E−03 | 1.8719E−03 | −2.3499E−04 | 1.2081E−05 |
| S8 | 1.1855E−02 | −1.2349E−02 | 7.0516E−02 | −2.6420E−03 | 6.7457E−04 | −1.0934E−04 | 1.0748E−05 | −6.0057E−07 | 1.5378E−08 |
| S9 | −1.2781E−01 | 3.1135E−02 | −1.7417E−03 | −5.0962E−04 | 1.2260E−04 | 1.2629E−05 | 7.1728E−07 | −2.1878E−08 | 2.8060E−10 |
| S10 | −5.8442E−02 | 1.8143E−02 | −4.0200E−03 | 6.3628E−04 | −6.9872E−05 | 5.0573E−06 | −2.2693E−07 | 5.7048E−09 | −6.1652E−11 |

TABLE 15

| f1(mm) | 4.49 | f(mm) | 5.05 |
|---|---|---|---|
| f2(mm) | −10.18 | TTL(mm) | 6.14 |

TABLE 15-continued

| f3(mm) | 25.95 | ImgH(mm) | 4.62 |
|---|---|---|---|
| f4(mm) | 6.27 | Semi-FOV(°) | 41.4 |
| f5(mm) | −3.81 | f/EPD | 2.03 |

Figure 10A:
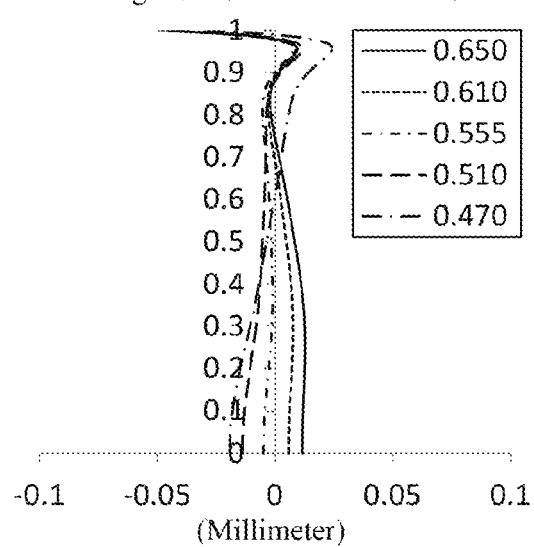
FIGS. 10A-10D illustrate a longitudinal aberration curve, an astigmatic curve, a distortion curve and a lateral color curve of the optical imaging lens assembly according to embodiment 5, respectively.
Figure 10B:
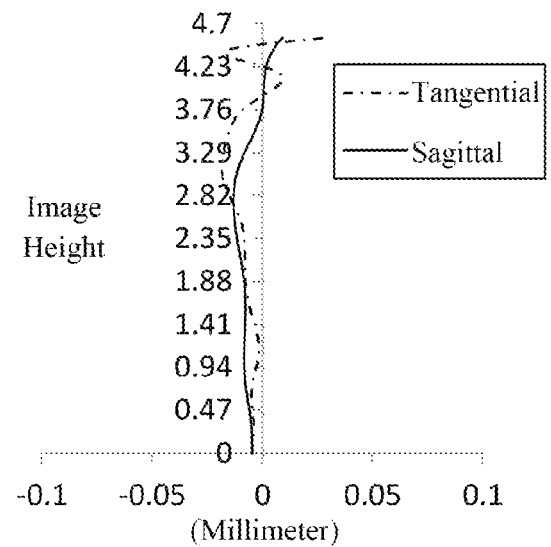
Figure 10C:
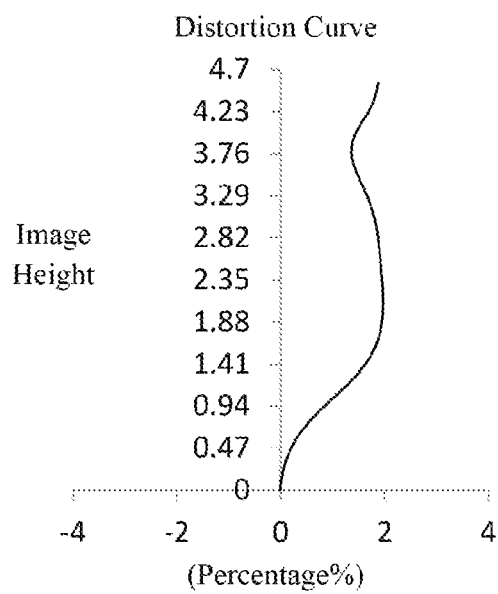
Figure 10D:
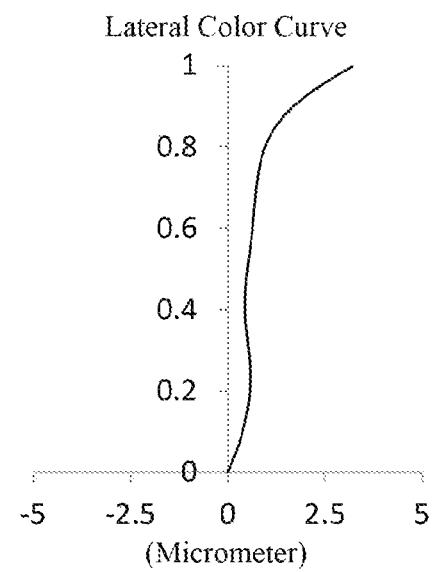

FIG. 10A illustrates a longitudinal aberration curve of the optical imaging lens assembly according to embodiment 5, representing deviations of focal points focused by light of different wavelengths after passing through the optical imaging lens assembly. FIG. 10B illustrates an astigmatic curve of the optical imaging lens assembly according to embodiment 5, representing a curvature of a tangential plane and a curvature of a sagittal plane. FIG. 10C illustrates a distortion curve of the optical imaging lens assembly according to embodiment 5, representing amounts of distortion corresponding to different image heights. FIG. 10D illustrates a lateral color curve of the optical imaging lens assembly according to embodiment 5, representing deviations of different image heights on an imaging plane after the light passes through the optical imaging lens assembly. It can be seen from FIG. 10A to FIG. 10D that the optical imaging lens assembly provided in embodiment 5 can achieve good image quality.

Embodiment 6

Figure 11:
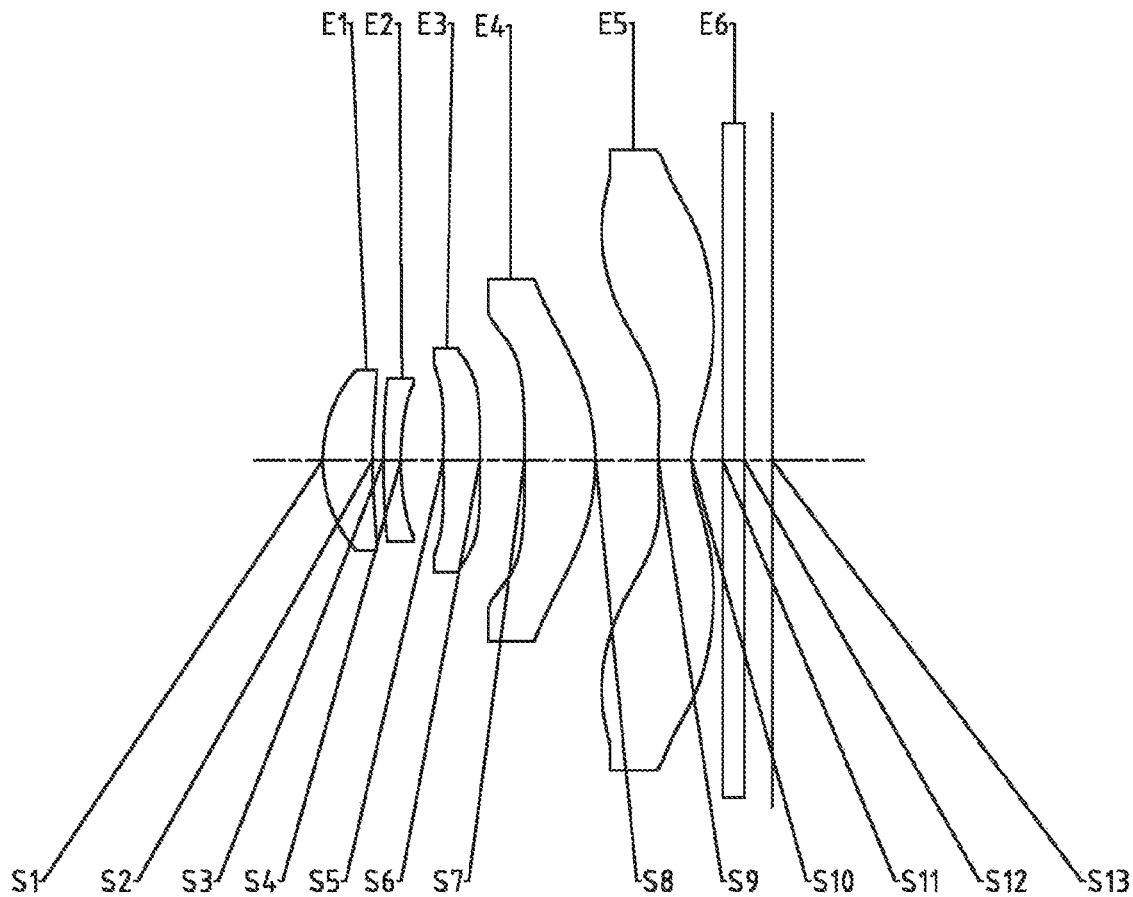
FIG. 11 is a schematic structural view of an optical imaging lens assembly according to embodiment 6 of the present disclosure.

An optical imaging lens assembly according to embodiment 6 of the present disclosure is described below with reference to FIG. 11 to FIG. 12D. FIG. 11 is a schematic structural view of the optical imaging lens assembly according to embodiment 6 of the present disclosure.

As shown in FIG. 11, the optical imaging lens assembly according to an exemplary implementation of the present disclosure includes, sequentially from an object side to an image side along an optical axis: a first lens E1, a second lens E2, a third lens E3, a fourth lens E4, a fifth lens E5, an optical filter E6 and an imaging plane S13.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a concave surface. The fourth lens E4 has positive refractive power, an object-side surface S7 thereof is a concave surface, and an image-side surface S8 thereof is a convex surface. The fifth lens E5 has negative refractive power, an object-side surface S9 thereof is a convex surface, and an image-side surface S10 thereof is a concave surface. The optical filter E6 has an object-side surface S11 and an image-side surface S12. Light from an object sequentially passes through the respective surfaces S1 to S12 and is finally imaged on the imaging plane S13.

The optical imaging lens assembly of the present embodiment may further include a stop STO disposed between the object side and the first lens E1, to improve an imaging quality of the optical imaging lens assembly.

Table 16 shows surface type, radius of curvature, thickness, material and conic coefficient of each lens of the optical imaging lens assembly in embodiment 6, wherein the units for the radius of curvature and the thickness are millimeter (mm). Table 17 shows high-order coefficients applicable to each aspheric surface in embodiment 6, wherein the surface type of each aspheric surface may be defined by the formula (1) given above in embodiment 1. Table 18 shows effective focal lengths f1 to f5 of the lenses, a total effective focal length f, a total optical length TTL, half of a diagonal length ImgH of an effective pixel area on the imaging plane S13, half of a maximal field-of-view angle Semi-FOV, and a ratio of the total effective focal length f to an entrance pupil diameter EPD of the optical imaging lens assembly in embodiment 6.

TABLE 16

| Surface number | Surface type | Radius of curvature | Thickness | Material Refractive index | Material Abbe number | Conic coefficient |
|---|---|---|---|---|---|---|
| OBJ | spherical | infinite | infinite | | | |
| STO | spherical | infinite | −0.4047 | | | |
| S1 | aspheric | 1.9397 | 0.6798 | 1.55 | 56.1 | −0.1515 |
| S2 | aspheric | 8.1077 | 0.1477 | | | 10.5906 |
| S3 | aspheric | 9.5215 | 0.2400 | 1.67 | 19.2 | 53.2846 |
| S4 | aspheric | 4.0116 | 0.5802 | | | 8.4482 |
| S5 | aspheric | 23.8981 | 0.4999 | 1.57 | 38.0 | −99.0000 |
| S6 | aspheric | 80.9843 | 0.6103 | | | −99.0000 |
| S7 | aspheric | −72.0994 | 0.9691 | 1.55 | 56.1 | 99.0000 |
| S8 | aspheric | −3.0918 | 0.8544 | | | −1.0383 |
| S9 | aspheric | 4.4081 | 0.4590 | 1.54 | 55.9 | −94.5918 |
| S10 | aspheric | 1.3888 | 0.4240 | | | −6.6566 |
| S11 | spherical | infinite | 0.2963 | 1.52 | 64.2 | |
| S12 | spherical | infinite | 0.3792 | | | |
| S13 | spherical | infinite | | | | |

TABLE 17

| Surface number | A4 | A6 | A8 | A10 | A12 |
|---|---|---|---|---|---|
| S1 | 4.5753E−03 | 5.2176E−03 | −7.3698E−03 | 9.5654E−03 | −7.6128E−03 |
| S2 | −3.4257E−02 | 2.8616E−02 | −5.7506E−02 | 1.7606E−01 | −3.6400E−01 |
| S3 | −6.2438E−02 | 6.1065E−02 | −2.2662E−02 | 3.7617E−02 | −1.5052E−01 |
| S4 | −3.7535E−02 | 6.5086E−02 | −9.0238E−02 | 3.1327E−01 | −7.9346E−01 |
| S5 | −5.6464E−02 | 2.3877E−02 | −1.0072E−01 | 2.4968E−01 | −3.8669E−01 |
| S6 | −5.1547E−02 | 3.3950E−03 | −1.6108E−02 | 1.9161E−02 | −1.2504E−02 |
| S7 | −1.3807E−02 | −1.0431E−02 | 7.5921E−03 | −9.1484E−03 | 7.4857E−03 |
| S8 | −4.6235E−03 | 2.5111E−03 | −2.9648E−03 | 1.3405E−03 | 8.2001E−06 |
| S9 | −1.2940E−01 | 3.3013E−02 | −2.2754E−03 | −4.0738E−04 | 1.0512E−04 |
| S10 | −4.8102E−02 | 1.1681E−02 | −1.6854E−03 | 1.2992E−04 | −1.6846E−06 |

TABLE 17-continued

| Surface number | A14 | A16 | A18 | A20 |
|---|---|---|---|---|
| S1 | 4.7847E−03 | −3.2167E−03 | 1.6439E−03 | −3.8525E−04 |
| S2 | 4.5686E−01 | −3.4084E−01 | 1.3900E−01 | −2.3902E−02 |
| S3 | 2.6347E−01 | −2.3932E−01 | 1.1204E−01 | −2.1532E−02 |
| S4 | 1.1904E+00 | 1.0389E+00 | 4.9056E−01 | −9.6956E−02 |
| S5 | 3.6325E−01 | −2.0292E−01 | 6.1810E−02 | −7.7580E−03 |
| S6 | 1.4110E−03 | 2.7940E−03 | −1.5273E−03 | 2.5818E−04 |
| S7 | −3.6776E−03 | 9.9816E−04 | −1.3487E−04 | 7.0441E−06 |
| S8 | −1.3775E−04 | 3.7166E−05 | −4.1072E−06 | 1.7079E−07 |
| S9 | −1.0489E−05 | 5.6202E−07 | −1.5951E−08 | 1.8876E−10 |
| S10 | −6.2750E−07 | 5.6628E−08 | −2.0270E−09 | 2.6991E−11 |

TABLE 18

| | | | |
|---|---|---|---|
| f1(mm) | 4.50 | f(mm) | 5.04 |
| f2(mm) | −10.41 | TTL(mm) | 6.14 |
| f3(mm) | 59.25 | ImgH(mm) | 4.61 |
| f4(mm) | 5.89 | Semi-FOV(°) | 41.4 |
| f5(mm) | −3.99 | f/EPD | 2.03 |

Figures 12A, 12B:
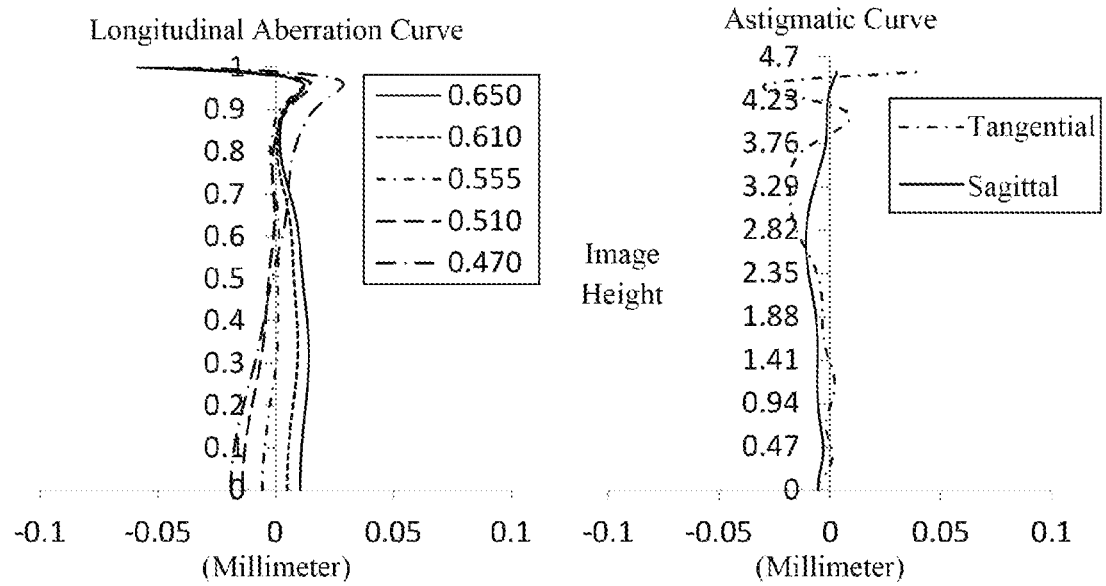
FIGS. 12A-12D illustrate a longitudinal aberration curve, an astigmatic curve, a distortion curve and a lateral color curve of the optical imaging lens assembly according to embodiment 6, respectively.
Figures 12C, 12D:
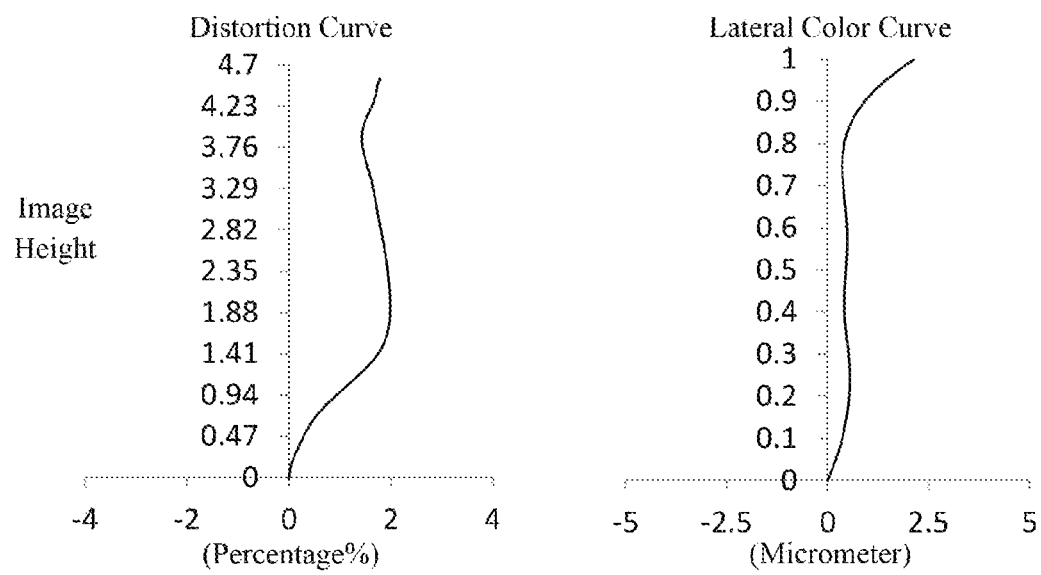

FIG. 12A illustrates a longitudinal aberration curve of the optical imaging lens assembly according to embodiment 6, representing deviations of focal points focused by light of different wavelengths after passing through the optical imaging lens assembly. FIG. 12B illustrates an astigmatic curve of the optical imaging lens assembly according to embodiment 6, representing a curvature of a tangential plane and a curvature of a sagittal plane. FIG. 12C illustrates a distortion curve of the optical imaging lens assembly according to embodiment 6, representing amounts of distortion corresponding to different image heights. FIG. 12D illustrates a lateral color curve of the optical imaging lens assembly according to embodiment 6, representing deviations of different image heights on an imaging plane after the light passes through the optical imaging lens assembly. It can be seen from FIG. 12A to FIG. 12D that the optical imaging lens assembly provided in embodiment 6 can achieve good image quality.

Embodiment 7

An optical imaging lens assembly according to embodiment 7 of the present disclosure is described below with reference to FIG. 13 to FIG. 14D. FIG. 13 is a schematic structural view of the optical imaging lens assembly according to embodiment 7 of the present disclosure.

As shown in FIG. 13, the optical imaging lens assembly according to an exemplary implementation of the present disclosure includes, sequentially from an object side to an image side along an optical axis: a first lens E1, a second lens E2, a third lens E3, a fourth lens E4, a fifth lens E5, an optical filter E6 and an imaging plane S13.

The first lens E1 has positive refractive power, an object-side surface S1 thereof is a convex surface, and an image-side surface S2 thereof is a concave surface. The second lens E2 has negative refractive power, an object-side surface S3 thereof is a concave surface, and an image-side surface S4 thereof is a concave surface. The third lens E3 has positive refractive power, an object-side surface S5 thereof is a concave surface, and an image-side surface S6 thereof is a convex surface. The fourth lens E4 has positive refractive power, an object-side surface S7 thereof is a convex surface, and an image-side surface S8 thereof is a convex surface. The fifth lens E5 has negative refractive power, an object-side surface S9 thereof is a convex surface, and an image-side surface S10 thereof is a concave surface. The optical filter E6 has an object-side surface S11 and an image-side surface S12. Light from an object sequentially passes through the respective surfaces S1 to S12 and is finally imaged on the imaging plane S13.

The optical imaging lens assembly of the present embodiment may further include a stop STO disposed between the object side and the first lens E1, to improve an imaging quality of the optical imaging lens assembly.

Table 19 shows surface type, radius of curvature, thickness, material and conic coefficient of each lens of the optical imaging lens assembly in embodiment 7, wherein the units for the radius of curvature and the thickness are millimeter (mm). Table 20 shows high-order coefficients applicable to each aspheric surface in embodiment 7, wherein the surface type of each aspheric surface may be defined by the formula (1) given above in embodiment 1. Table 21 shows effective focal lengths f1 to f5 of the lenses, a total effective focal length f, a total optical length TTL, half of a diagonal length ImgH of an effective pixel area on the imaging plane S13, half of a maximal field-of-view angle Semi-FOV, and a ratio of the total effective focal length f to an entrance pupil diameter EPD of the optical imaging lens assembly in embodiment 7.

TABLE 19

| Surface number | Surface type | Radius of curvature | Thickness | Material Refractive index | Material Abbe number | Conic coefficient |
|---|---|---|---|---|---|---|
| OBJ | spherical | infinite | infinite | | | |
| STO | spherical | infinite | −0.4246 | | | |
| S1 | aspheric | 1.9961 | 0.6791 | 1.55 | 56.1 | −0.1485 |
| S2 | aspheric | 9.6590 | 0.1626 | | | 18.2522 |
| S3 | aspheric | −66.4409 | 0.2614 | 1.67 | 19.2 | −99.0000 |
| S4 | aspheric | 6.7546 | 0.3846 | | | 15.6963 |
| S5 | aspheric | −18.6094 | 0.6085 | 1.57 | 38.0 | 86.6142 |
| S6 | aspheric | −6.3209 | 1.0215 | | | −9.4556 |
| S7 | aspheric | 21.6827 | 0.7347 | 1.55 | 56.1 | −81.5933 |
| S8 | aspheric | −4.6515 | 0.8057 | | | −0.4567 |
| S9 | aspheric | 4.7288 | 0.4000 | 1.54 | 55.9 | −99.0000 |
| S10 | aspheric | 1.3686 | 0.4153 | | | −6.6067 |
| S11 | spherical | infinite | 0.2963 | 1.52 | 64.2 | |
| S12 | spherical | infinite | 0.3705 | | | |
| S13 | spherical | infinite | | | | |

TABLE 20

| Surface number | A4 | A6 | A8 | A10 | A12 |
|---|---|---|---|---|---|
| S1 | 5.3915E−03 | −3.1414E−03 | 2.7012E−02 | −7.3085E−02 | 1.1719E−01 |
| S2 | −2.9336E−02 | 2.2835E−02 | −4.0098E−02 | 1.2886E−01 | −2.8635E−01 |
| S3 | −4.0418E−02 | 6.4880E−02 | −3.6517E−03 | −8.8688E−02 | 1.5766E−01 |
| S4 | −2.4571E−02 | 5.5004E−02 | 1.4741E−02 | −1.2131E−01 | 2.0202E−01 |
| S5 | −6.4868E−02 | −9.0433E−03 | 5.2027E−02 | −2.5265E−01 | 6.1777E−01 |
| S6 | −5.0859E−02 | −1.3438E−02 | 2.9494E−02 | −5.5575E−02 | 6.2908E−02 |
| S7 | −3.0659E−03 | −1.5340E−02 | 1.2949E−02 | −1.0850E−02 | 6.0436E−03 |
| S8 | 9.6923E−03 | −8.3720E−03 | 4.5404E−03 | −2.2595E−03 | 8.6869E−04 |
| S9 | −1.6160E−01 | 6.0164E−02 | −1.4101E−02 | 2.7256E−03 | −4.2065E−04 |
| S10 | −6.4930E−02 | 2.3239E−02 | −5.7014E−03 | 1.0018E−03 | −1.2406E−04 |

| Surface number | A14 | A16 | A18 | A20 |
|---|---|---|---|---|
| S1 | −1.1371E−01 | 6.5473E−02 | −2.0604E−02 | 2.6999E−03 |
| S2 | 3.8026E−01 | −2.9733E−01 | 1.2613E−01 | −2.2365E−02 |
| S3 | −1.5371E−01 | 9.0964E−02 | −2.9652E−02 | 4.0716E−03 |
| S4 | −2.0483E−01 | 1.4569E−01 | −6.8602E−02 | 1.6585E−02 |
| S5 | −9.2216E−01 | 8.2421E−01 | −4.0833E−01 | 8.7196E−02 |
| S6 | −4.5922E−02 | 2.1722E−02 | −6.2382E−03 | 8.7198E−04 |
| S7 | −2.1354E−03 | 4.5033E−04 | −5.0562E−05 | 2.3082E−06 |
| S8 | −2.1245E−04 | 3.0818E−05 | −2.4171E−06 | 7.8967E−08 |
| S9 | 4.5552E−05 | −3.1167E−06 | 1.1986E−07 | −1.9727E−09 |
| S10 | 1.0395E−05 | −5.5559E−07 | 1.6986E−08 | −2.2494E−10 |

TABLE 21

| f1(mm) | 4.47 | f(mm) | 5.04 |
|---|---|---|---|
| f2(mm) | −9.04 | TTL(mm) | 6.14 |
| f3(mm) | 16.49 | ImgH(mm) | 4.73 |
| f4(mm) | 7.09 | Semi-FOV(°) | 42.0 |
| f5(mm) | −3.74 | f/EPD | 2.02 |

Figures 14C, 14D:
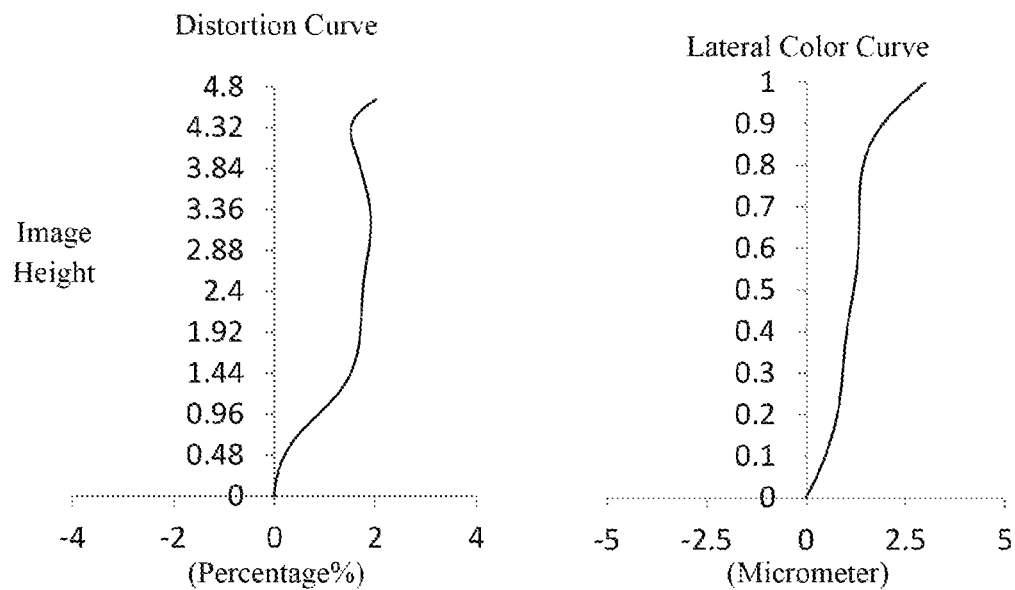

FIG. 14A illustrates a longitudinal aberration curve of the optical imaging lens assembly according to embodiment 7, representing deviations of focal points focused by light of different wavelengths after passing through the optical imaging lens assembly. FIG. 14B illustrates an astigmatic curve of the optical imaging lens assembly according to embodiment 7, representing a curvature of a tangential plane and a curvature of a sagittal plane. FIG. 14C illustrates a distortion curve of the optical imaging lens assembly according to embodiment 7, representing amounts of distortion corresponding to different image heights. FIG. 14D illustrates a lateral color curve of the optical imaging lens assembly according to embodiment 7, representing deviations of different image heights on an imaging plane after the light passes through the optical imaging lens assembly. It can be seen from FIG. 14A to FIG. 14D that the optical imaging lens assembly provided in embodiment 7 can achieve good image quality.

Embodiment 8

Figure 15:
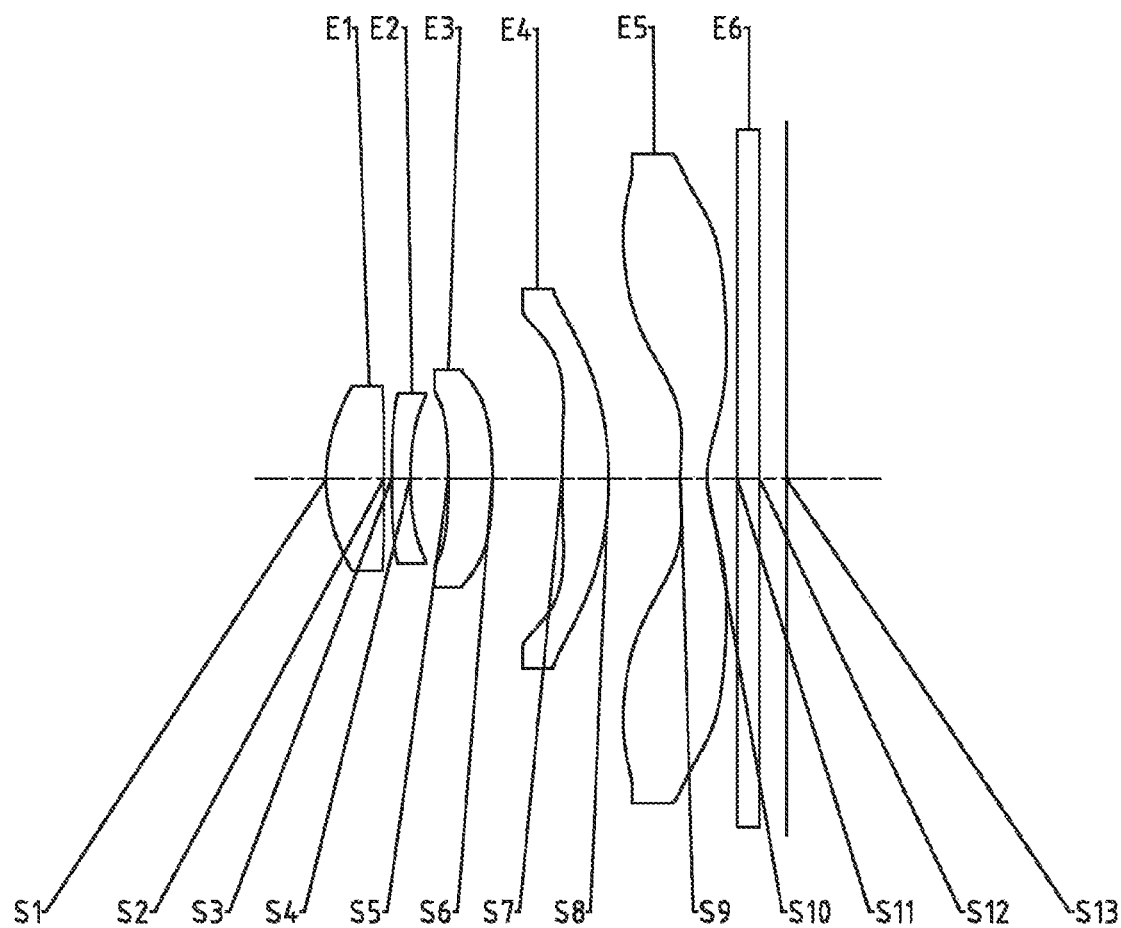
FIG. 15 is a schematic structural view of an optical imaging lens assembly according to embodiment 8 of the present disclosure.

An optical imaging lens assembly according to embodiment 8 of the present disclosure is described below with reference to FIG. 15 to FIG. 16D. FIG. 15 is a schematic structural view of the optical imaging lens assembly according to embodiment 8 of the present disclosure.

As shown in FIG. 15, the optical imaging lens assembly according to an exemplary implementation of the present disclosure includes, sequentially from an object side to an image side along an optical axis: a first lens E1, a second lens E2, a third lens E3, a fourth lens E4, a fifth lens E5, an optical filter E6 and an imaging plane S13.

The first lens E1 has positive refractive power, an object-side surface S1 thereof is a convex surface, and an image-side surface S2 thereof is a convex surface. The second lens E2 has negative refractive power, an object-side surface S3 thereof is a convex surface, and an image-side surface S4 thereof is a concave surface. The third lens E3 has positive refractive power, an object-side surface S5 thereof is a concave surface, and an image-side surface S6 thereof is a convex surface. The fourth lens E4 has positive refractive power, an object-side surface S7 thereof is a convex surface, and an image-side surface S8 thereof is a convex surface. The fifth lens E5 has negative refractive power, an object-side surface S9 thereof is a convex surface, and an image-side surface S10 thereof is a concave surface. The optical filter E6 has an object-side surface S11 and an image-side surface S12. Light from an object sequentially passes through the respective surfaces S1 to S12 and is finally imaged on the imaging plane S13.

The optical imaging lens assembly of the present embodiment may further include a stop STO disposed between the object side and the first lens E1, to improve an imaging quality of the optical imaging lens assembly.

Table 22 shows surface type, radius of curvature, thickness, material and conic coefficient of each lens of the optical imaging lens assembly in embodiment 8, wherein the units for the radius of curvature and the thickness are millimeter (mm). Table 23 shows high-order coefficients applicable to each aspheric surface in embodiment 8, wherein the surface type of each aspheric surface may be defined by the formula (1) given above in embodiment 1. Table 24 shows effective focal lengths f1 to f5 of the lenses, a total effective focal length f, a total optical length TTL, half of a diagonal length ImgH of an effective pixel area on the imaging plane S13, half of a maximal field-of-view angle Semi-FOV, and a ratio of the total effective focal length f to an entrance pupil diameter EPD of the optical imaging lens assembly in embodiment 8.

TABLE 22

| Surface number | Surface type | Radius of curvature | Thickness | Material Refractive index | Abbe number | Conic coefficient |
|---|---|---|---|---|---|---|
| OBJ | spherical | infinite | infinite | | | |
| STO | spherical | infinite | −0.3361 | | | |
| S1 | aspheric | 2.2315 | 0.7727 | 1.55 | 56.1 | −0.5765 |
| S2 | aspheric | −375.8174 | 0.1016 | | | −99.0000 |
| S3 | aspheric | 11.8849 | 0.2474 | 1.67 | 19.2 | 93.5608 |
| S4 | aspheric | 3.4804 | 0.5103 | | | 6.3454 |
| S5 | aspheric | −13.4502 | 0.5855 | 1.57 | 38.0 | 81.3754 |
| S6 | aspheric | −6.9780 | 0.9288 | | | 9.0701 |
| S7 | aspheric | 14.6070 | 0.6253 | 1.55 | 56.1 | −99.0000 |
| S8 | aspheric | −4.4396 | 0.9556 | | | 0.0928 |
| S9 | aspheric | 3.7394 | 0.3500 | 1.54 | 55.9 | −99.0000 |
| S10 | aspheric | 1.2655 | 0.4056 | | | −7.4502 |
| S11 | spherical | infinite | 0.2963 | 1.52 | 64.2 | |
| S12 | spherical | infinite | 0.3608 | | | |
| S13 | spherical | infinite | | | | |

TABLE 23

| Surface number | A4 | A6 | A8 | A10 | A12 |
|---|---|---|---|---|---|
| S1 | 2.2990E−03 | 4.7846E−03 | −7.8713E−03 | −9.2307E−03 | 3.8825E−02 |
| S2 | −1.7434E−02 | 3.6687E−02 | −6.4461E−02 | 9.4895E−02 | −1.2797E−01 |
| S3 | −3.0356E−02 | 7.4809E−02 | −8.3200E−02 | 6.2580E−02 | −3.3985E−02 |
| S4 | −3.2769E−02 | 5.7992E−02 | −9.0202E−02 | 1.4415E−01 | −2.3011E−01 |
| S5 | −5.2249E−02 | −2.1828E−02 | 7.7423E−02 | −2.3772E−01 | 4.4408E−01 |
| S6 | −4.3915E−02 | −1.9338E−02 | 4.7890E−02 | −9.6829E−02 | 1.2187E−01 |
| S7 | −5.7936E−03 | −8.3547E−03 | 2.1691E−03 | −2.9441E−03 | 2.5907E−03 |
| S8 | 2.5066E−03 | 2.0162E−03 | −6.6838E−03 | 4.0280E−03 | −1.0875E−03 |
| S9 | −1.7315E−01 | 5.9718E−02 | −9.6893E−03 | 8.2414E−04 | −2.7963E−05 |
| S10 | −6.1222E−02 | 1.7338E−02 | −2.6787E−03 | 2.2517E−04 | −6.4645E−06 |

| Surface number | A14 | A16 | A18 | A20 |
|---|---|---|---|---|
| S1 | −5.3697E−02 | 3.7746E−02 | −1.3623E−02 | 1.9971E−03 |
| S2 | 1.3494E−01 | −9.7909E−02 | 4.2209E−02 | −8.0243E−03 |
| S3 | 3.1984E−02 | −4.0705E−02 | 2.8401E−02 | −7.7507E−03 |
| S4 | 2.8526E−01 | −2.2960E−01 | 1.0480E−01 | −2.0369E−02 |
| S5 | −5.5051E−01 | 4.3293E−01 | −1.9574E−01 | 3.9139E−02 |
| S6 | −9.8886E−02 | 4.9788E−02 | −1.4172E−02 | 1.7577E−03 |
| S7 | −1.1898E−03 | 2.8800E−04 | −3.4648E−05 | 1.6408E−06 |
| S8 | 1.3669E−04 | −3.8635E−06 | −7.3288E−07 | 5.2639E−08 |
| S9 | −1.0294E−06 | 1.3561E−07 | −4.9218E−09 | 6.4379E−11 |
| S10 | −5.4263E−07 | 5.8065E−08 | −2.0648E−09 | 2.6422E−11 |

TABLE 24

| f1(mm) | 4.07 | f(mm) | 5.00 |
|---|---|---|---|
| f2(mm) | −7.35 | TTL(mm) | 6.14 |
| f3(mm) | 24.61 | ImgH(mm) | 4.63 |
| f4(mm) | 6.31 | Semi-FOV(°) | 41.7 |
| f5(mm) | −3.75 | f/EPD | 2.03 |

Figure 16A:
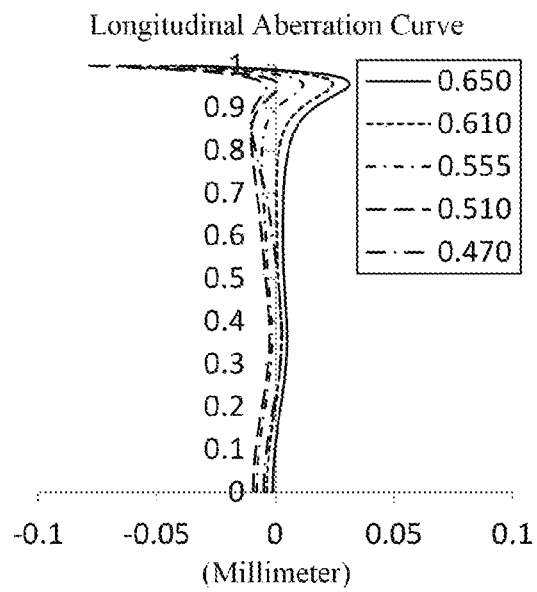
FIGS. 16A-16D illustrate a longitudinal aberration curve, an astigmatic curve, a distortion curve and a lateral color curve of the optical imaging lens assembly according to embodiment 8, respectively.
Figure 16B:
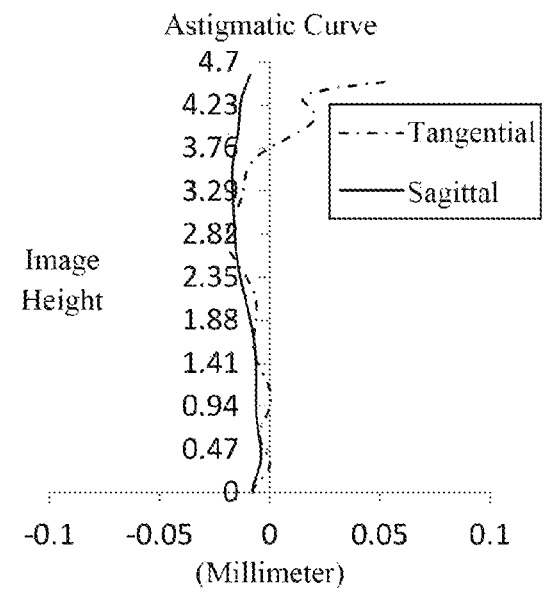
Figure 16C:
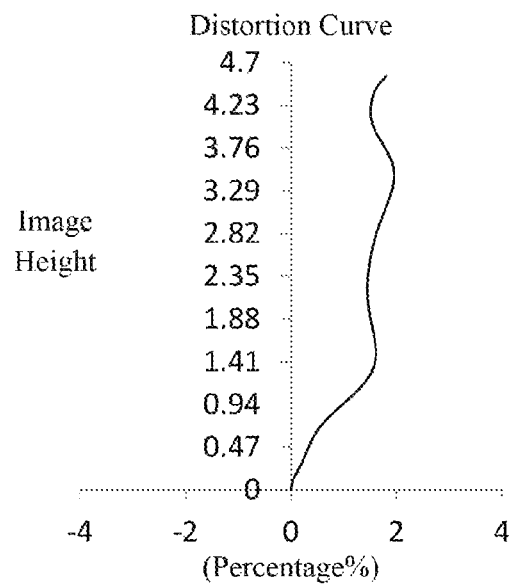
Figure 16D:
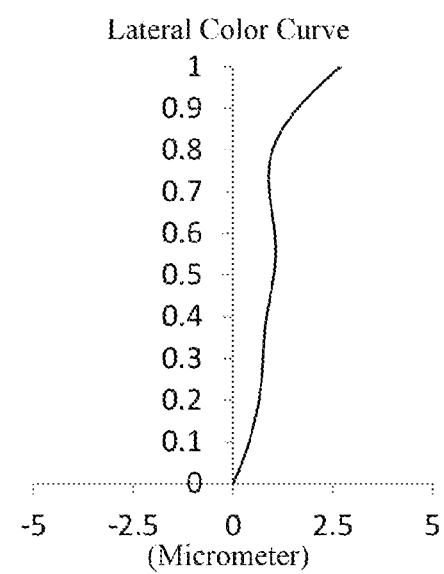

FIG. 16A illustrates a longitudinal aberration curve of the optical imaging lens assembly according to embodiment 8, representing deviations of focal points focused by light of different wavelengths after passing through the optical imaging lens assembly. FIG. 16B illustrates an astigmatic curve of the optical imaging lens assembly according to embodiment 8, representing a curvature of a tangential plane and a curvature of a sagittal plane. FIG. 16C illustrates a distortion curve of the optical imaging lens assembly according to embodiment 8, representing amounts of distortion corresponding to different image heights. FIG. 16D illustrates a lateral color curve of the optical imaging lens assembly according to embodiment 8, representing deviations of different image heights on an imaging plane after the light passes through the optical imaging lens assembly. It can be seen from FIG. 16A to FIG. 16D that the optical imaging lens assembly provided in embodiment 8 can achieve good image quality.

Embodiment 9

An optical imaging lens assembly according to embodiment 9 of the present disclosure is described below with reference to FIG. 17 to FIG. 18D. FIG. 17 is a schematic structural view of the optical imaging lens assembly according to embodiment 9 of the present disclosure.

As shown in FIG. 17, the optical imaging lens assembly according to an exemplary implementation of the present disclosure includes, sequentially from an object side to an image side along an optical axis: a first lens E1, a second lens E2, a third lens E3, a fourth lens E4, a fifth lens E5, an optical filter E6 and an imaging plane S13.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has negative refractive power, an object-side surface S5 thereof is a concave surface, and an image-side surface S6 thereof is a convex surface. The fourth lens E4 has positive refractive power, an object-side surface S7 thereof is a convex surface, and an image-side surface S8 thereof is a convex surface. The fifth lens E5 has negative refractive power, an object-side surface S9 thereof is a convex surface, and an image-side surface S10 thereof is a concave surface. The optical filter E6 has an object-side surface S11 and an image-side surface S12. Light from an object sequentially passes through the respective surfaces S1 to S12 and is finally imaged on the imaging plane S13.

The optical imaging lens assembly of the present embodiment may further include a stop STO disposed between the object side and the first lens E1, to improve an imaging quality of the optical imaging lens assembly.

Table 25 shows surface type, radius of curvature, thickness, material and conic coefficient of each lens of the optical imaging lens assembly in embodiment 9, wherein the units for the radius of curvature and the thickness are millimeter (mm). Table 26 shows high-order coefficients applicable to each aspheric surface in embodiment 9, wherein the surface type of each aspheric surface may be defined by the formula (1) given above in embodiment 1. Table 27 shows effective focal lengths f1 to f5 of the lenses, a total effective focal length f, a total optical length TTL, half of a diagonal length ImgH of an effective pixel area on the imaging plane S13, half of a maximal field-of-view angle Semi-FOV, and a ratio of the total effective focal length f to an entrance pupil diameter EPD of the optical imaging lens assembly in embodiment 9.

TABLE 25

| Surface number | Surface type | Radius of curvature | Thickness | Material Refractive index | Material Abbe number | Conic coefficient |
|---|---|---|---|---|---|---|
| OBJ | spherical | infinite | infinite | | | |
| STO | spherical | infinite | −0.4504 | | | |
| S1 | aspheric | 1.9508 | 0.7972 | 1.55 | 56.1 | −0.2268 |
| S2 | aspheric | 7.0264 | 0.0813 | | | −6.5933 |
| S3 | aspheric | 8.3679 | 0.2400 | 1.67 | 19.2 | 48.5893 |
| S4 | aspheric | 5.1135 | 0.5771 | | | 11.3896 |
| S5 | aspheric | −10.5551 | 0.6318 | 1.57 | 38.0 | 28.4398 |
| S6 | aspheric | −11.7136 | 0.5474 | | | −18.7700 |
| S7 | aspheric | 52.9457 | 0.9425 | 1.55 | 56.1 | −99.0000 |
| S8 | aspheric | −3.2276 | 0.6024 | | | −1.1709 |
| S9 | aspheric | 18.9845 | 0.6000 | 1.54 | 55.9 | −97.7703 |
| S10 | aspheric | 1.6855 | 0.4344 | | | −5.9734 |
| S11 | spherical | infinite | 0.2963 | 1.52 | 64.2 | |
| S12 | spherical | infinite | 0.3896 | | | |
| S13 | spherical | infinite | | | | |

TABLE 26

| Surface number | A4 | A6 | A8 | A10 | A12 |
|---|---|---|---|---|---|
| S1 | 4.5980E−03 | 5.4045E−03 | −2.9469E−03 | −9.9622E−03 | 2.9034E−02 |
| S2 | −4.7877E−02 | 2.3138E−02 | −1.0586E−03 | −9.6526E−03 | 1.2350E−02 |
| S3 | −7.2638E−02 | 5.8635E−02 | −5.3583E−02 | 1.8295E−01 | −4.5383E−01 |
| S4 | −2.3086E−02 | 1.7056E−02 | 1.2245E−01 | −3.6737E−01 | 6.4674E−01 |
| S5 | −4.3417E−02 | −7.2619E−02 | 2.6296E−01 | −6.5055E−01 | 1.0378E+00 |
| S6 | −4.2556E−02 | −2.4859E−02 | 2.8714E−02 | −2.2327E−02 | 7.0870E−03 |
| S7 | 4.2423E−03 | −3.0502E−02 | 1.8245E−02 | −8.7842E−03 | 1.8242E−03 |
| S8 | 2.3897E−02 | −2.3204E−02 | 1.3251E−02 | −5.1488E−03 | 1.1897E−03 |
| S9 | −1.3578E−01 | 3.7593E−02 | −4.6005E−03 | 2.2472E−04 | 1.0651E−05 |
| S10 | −6.1619E−02 | 2.0342E−02 | −4.9126E−03 | 8.3616E−04 | −9.6910E−05 |

| Surface number | A14 | A16 | A18 | A20 |
|---|---|---|---|---|
| S1 | −3.6080E−02 | 2.3790E−02 | −8.2671E−03 | 1.1703E−03 |
| S2 | −1.4383E−02 | 9.1939E−03 | −1.3835E−03 | −5.9005E−04 |
| S3 | 6.4937E−01 | −5.4594E−01 | 2.5307E−01 | −5.0450E−02 |
| S4 | −7.2049E−01 | 5.0150E−01 | −1.9626E−01 | 3.3145E−02 |
| S5 | 1.0705E+00 | 6.8573E−01 | −2.4654E−01 | 3.8235E−02 |
| S6 | 3.3497E−03 | −4.0035E−03 | 1.4686E−03 | −1.8614E−04 |
| S7 | 2.3900E−04 | −2.3246E−04 | 5.4079E−05 | −4.4312E−06 |
| S8 | −1.3276E−04 | 2.4101E−06 | 7.3473E−07 | −4.4168E−08 |
| S9 | −2.2753E−06 | 1.4426E−07 | −4.3758E−09 | 5.3481E−11 |
| S10 | 7.2553E−06 | −3.2870E−07 | 8.0808E−09 | −8.1763E−11 |

TABLE 27

| f1(mm) | 4.69 | f(mm) | 5.08 |
|---|---|---|---|
| f2(mm) | −20.00 | TTL(mm) | 6.14 |
| f3(mm) | −233.31 | ImgH(mm) | 4.65 |
| f4(mm) | 5.61 | Semi-FOV(°) | 41.5 |
| f5(mm) | −3.49 | f/EPD | 2.03 |

Figure 18C:
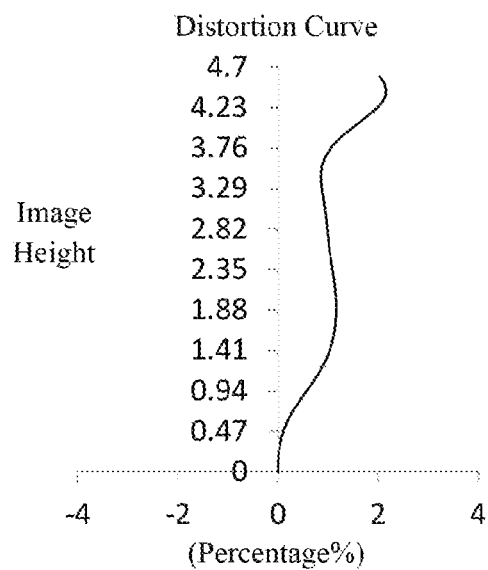
Figure 18D:
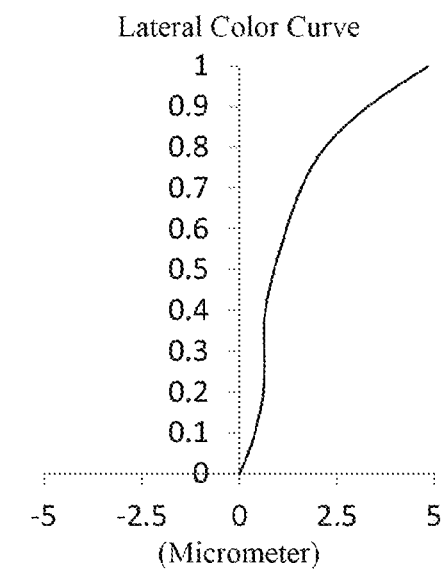

FIG. 18A illustrates a longitudinal aberration curve of the optical imaging lens assembly according to embodiment 9, representing deviations of focal points focused by light of different wavelengths after passing through the optical imaging lens assembly. FIG. 18B illustrates an astigmatic curve of the optical imaging lens assembly according to embodiment 9, representing a curvature of a tangential plane and a curvature of a sagittal plane. FIG. 18C illustrates a distortion curve of the optical imaging lens assembly according to embodiment 9, representing amounts of distortion corresponding to different image heights. FIG. 18D illustrates a lateral color curve of the optical imaging lens assembly according to embodiment 9, representing deviations of different image heights on an imaging plane after the light passes through the optical imaging lens assembly. It can be seen from FIG. 18A to FIG. 18D that the optical imaging lens assembly provided in embodiment 9 can achieve good image quality.

Embodiment 10

Figure 19:
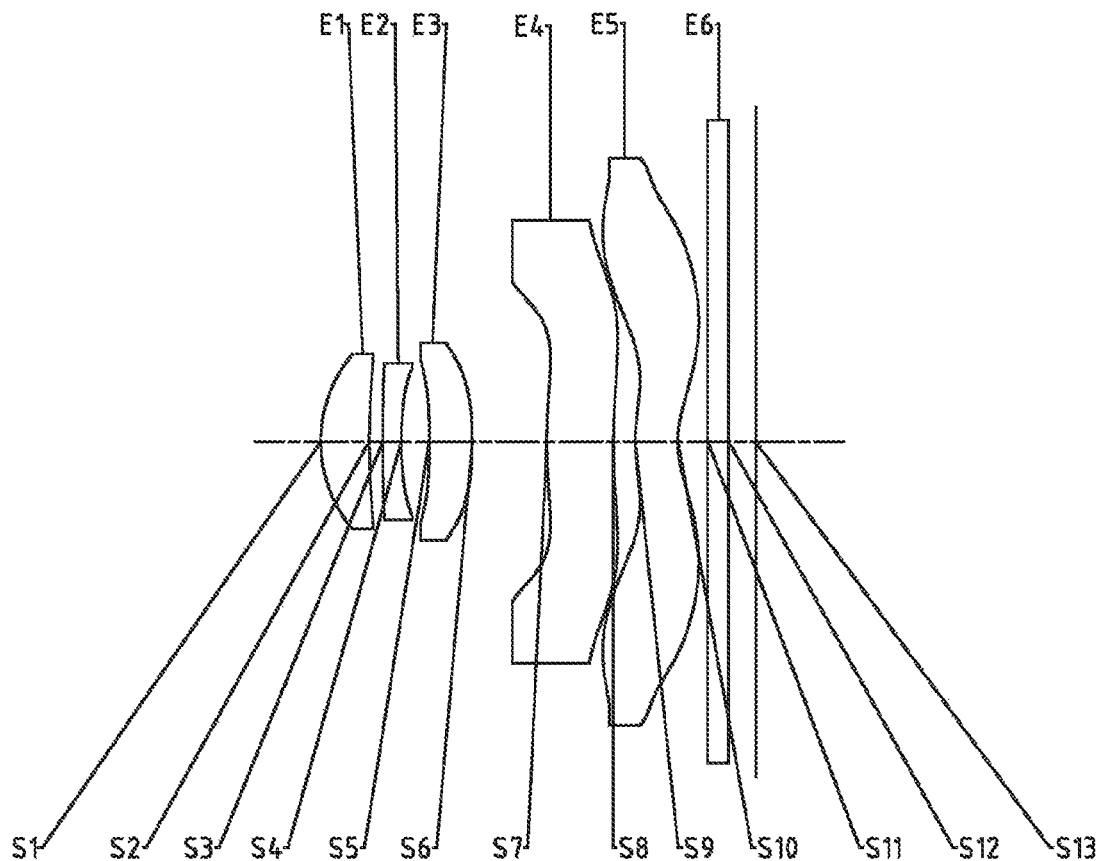
FIG. 19 is a schematic structural view of an optical imaging lens assembly according to embodiment 10 of the present disclosure.

An optical imaging lens assembly according to embodiment 10 of the present disclosure is described below with reference to FIG. 19 to FIG. 20D. FIG. 19 is a schematic structural view of the optical imaging lens assembly according to embodiment 10 of the present disclosure.

As shown in FIG. 19, the optical imaging lens assembly according to an exemplary implementation of the present disclosure includes, sequentially from an object side to an image side along an optical axis: a first lens E1, a second lens E2, a third lens E3, a fourth lens E4, a fifth lens E5, an optical filter E6 and an imaging plane S13.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a concave surface, and an image-side surface S6 thereof is a convex surface. The fourth lens E4 has negative refractive power, an object-side surface S7 thereof is a convex surface, and an image-side surface S8 thereof is a concave surface. The fifth lens E5 has negative refractive power, an object-side surface S9 thereof is a convex surface, and an image-side surface S10 thereof is a concave surface. The optical filter E6 has an object-side surface S11 and an image-side surface S12. Light from an object sequentially passes through the respective surfaces S1 to S12 and is finally imaged on the imaging plane S13.

The optical imaging lens assembly of the present embodiment may further include a stop STO disposed between the object side and the first lens E1, to improve an imaging quality of the optical imaging lens assembly.

Table 28 shows surface type, radius of curvature, thickness, material and conic coefficient of each lens of the optical imaging lens assembly in embodiment 10, wherein the units for the radius of curvature and the thickness are millimeter (mm). Table 29 shows high-order coefficients applicable to each aspheric surface in embodiment 10, wherein the surface type of each aspheric surface may be defined by the formula (1) given above in embodiment 1. Table 30 shows effective focal lengths f1 to f5 of the lenses, a total effective focal length f, a total optical length TTL, half of a diagonal length ImgH of an effective pixel area on the imaging plane S13, half of a maximal field-of-view angle Semi-FOV, and a ratio of the total effective focal length f to an entrance pupil diameter EPD of the optical imaging lens assembly in embodiment 10.

TABLE 28

| Surface number | Surface type | Radius of curvature | Thickness | Refractive index | Abbe number | Conic coefficient |
|---|---|---|---|---|---|---|
| OBJ | spherical | infinite | infinite | | | |
| STO | spherical | infinite | −0.4466 | | | |
| S1 | aspheric | 1.9553 | 0.6824 | 1.55 | 56.1 | −0.1902 |
| S2 | aspheric | 7.6732 | 0.1922 | | | 7.1679 |
| S3 | aspheric | 14.3144 | 0.2621 | 1.67 | 19.2 | 83.3037 |
| S4 | aspheric | 4.5063 | 0.3941 | | | 9.0072 |
| S5 | aspheric | −18.1671 | 0.6095 | 1.57 | 38.0 | −97.2583 |
| S6 | aspheric | −4.8702 | 1.0503 | | | −4.4769 |
| S7 | aspheric | 7.4556 | 0.9383 | 1.55 | 56.1 | −18.9264 |
| S8 | aspheric | 6.3977 | 0.3121 | | | −99.0000 |
| S9 | aspheric | 2.3281 | 0.6000 | 1.54 | 55.9 | −15.7048 |
| S10 | aspheric | 1.4304 | 0.4238 | | | −5.4821 |
| S11 | spherical | infinite | 0.2963 | 1.52 | 64.2 | |
| S12 | spherical | infinite | 0.3790 | | | |
| S13 | spherical | infinite | | | | |

TABLE 29

| Surface number | A4 | A6 | A8 | A10 | A12 |
|---|---|---|---|---|---|
| S1 | 3.4618E−03 | 7.5704E−03 | −2.2391E−02 | 5.3449E−02 | −8.0582E−02 |
| S2 | −3.3451E−02 | 2.0143E−02 | −3.1095E−02 | 1.0201E−01 | −2.2594E−01 |
| S3 | −6.7433E−02 | 6.9630E−02 | −3.7874E−02 | 9.2998E−02 | −2.3865E−01 |
| S4 | −4.7252E−02 | 7.9874E−02 | −1.1021E−01 | 3.4493E−01 | −7.3657E−01 |
| S5 | −5.7869E−02 | 1.4747E−02 | −6.2824E−02 | 1.7688E−01 | −3.2076E−01 |
| S6 | −4.6585E−02 | −2.3793E−02 | 8.7556E−02 | −1.9312E−01 | 2.5599E−01 |
| S7 | −2.6664E−03 | −2.1202E−02 | 1.7526E−02 | −1.1341E−02 | 4.4899E−03 |
| S8 | −7.1122E−03 | 1.3622E−03 | −4.8491E−04 | −2.2870E−04 | 1.2399E−04 |
| S9 | −1.0236E−01 | 1.7524E−02 | 2.1937E−03 | −1.3187E−03 | 2.3870E−04 |
| S10 | −5.7440E−02 | 1.7678E−02 | −4.3918E−03 | 7.6357E−04 | −8.3568E−05 |

| Surface number | A14 | A16 | A18 | A20 |
|---|---|---|---|---|
| S1 | 7.7534E−02 | −4.6386E−02 | 1.5727E−02 | −2.3279E−03 |
| S2 | 2.9866E−01 | −2.3259E−01 | 9.8296E−02 | −1.7436E−02 |
| S3 | 3.3107E−01 | −2.5954E−01 | 1.0976E−01 | −1.9681E−02 |
| S4 | 9.3856E−01 | −7.0468E−01 | 2.9076E−01 | −5.0852E−02 |
| S5 | 3.5798E−01 | −2.3303E−01 | 7.9870E−02 | −1.0187E−02 |
| S6 | −2.1021E−01 | 1.0491E−01 | −2.9198E−02 | 3.5016E−03 |
| S7 | −1.1275E−03 | 1.7564E−04 | −1.5004E−05 | 5.2264E−07 |
| S8 | −2.3286E−05 | 2.2574E−06 | −1.1497E−07 | 2.4563E−09 |

TABLE 29-continued

| | | | | |
|---|---|---|---|---|
| S9 | −2.3600E−05 | 1.3601E−06 | −4.2965E−08 | 5.7627E−10 |
| S10 | 5.3734E−06 | −1.8464E−07 | 2.6609E−09 | −2.6150E−12 |

TABLE 30

| | | | |
|---|---|---|---|
| f1(mm) | 4.61 | f(mm) | 5.03 |
| f2(mm) | −9.81 | TTL(mm) | 6.14 |
| f3(mm) | 11.47 | ImgH(mm) | 4.61 |
| f4(mm) | −120.25 | Semi-FOV(°) | 41.3 |
| f5(mm) | −9.01 | f/EPD | 2.02 |

FIG. 20A illustrates a longitudinal aberration curve of the optical imaging lens assembly according to embodiment 10, representing deviations of focal points focused by light of different wavelengths after passing through the optical imaging lens assembly. FIG. 20B illustrates an astigmatic curve of the optical imaging lens assembly according to embodiment 10, representing a curvature of a tangential plane and a curvature of a sagittal plane. FIG. 20C illustrates a distortion curve of the optical imaging lens assembly according to embodiment 10, representing amounts of distortion corresponding to different image heights. FIG. 20D illustrates a lateral color curve of the optical imaging lens assembly according to embodiment 10, representing deviations of different image heights on an imaging plane after the light passes through the optical imaging lens assembly. It can be seen from FIG. 20A to FIG. 20D that the optical imaging lens assembly provided in embodiment 10 can achieve good image quality.

Embodiment 11

Figure 21:
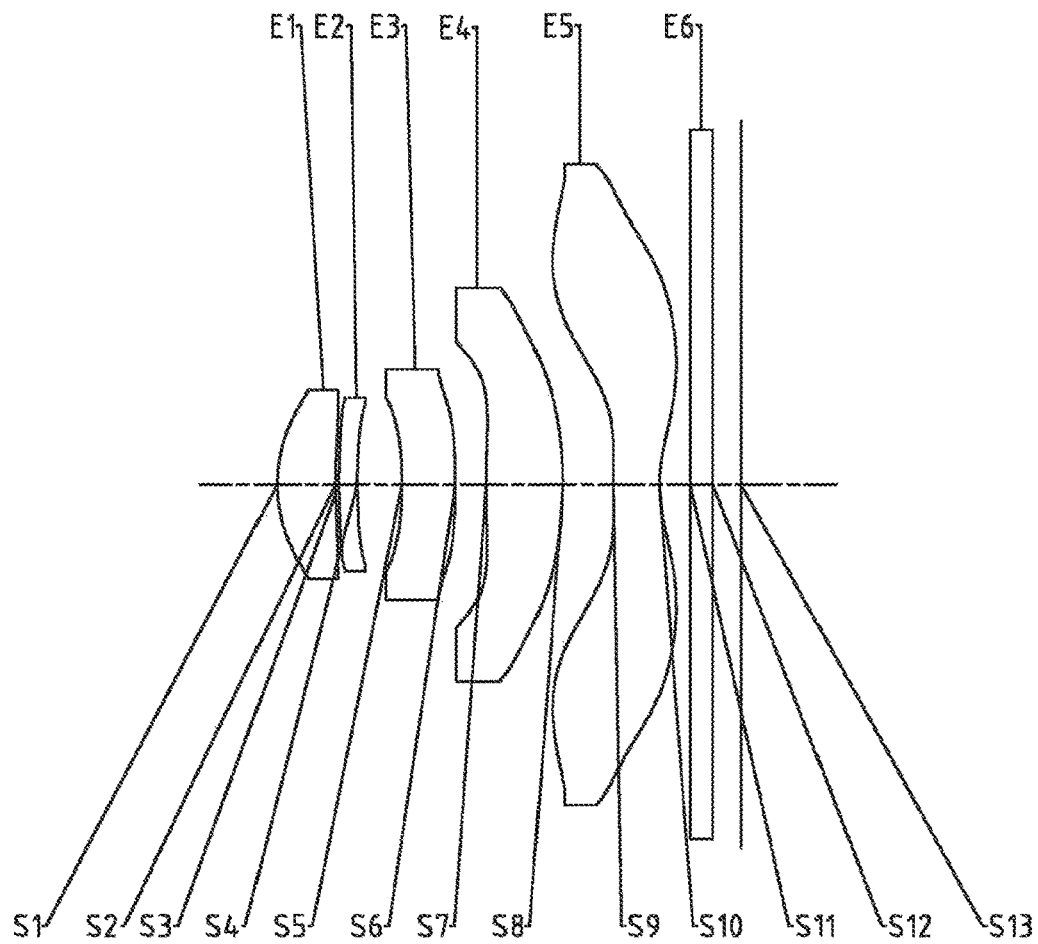
FIG. 21 is a schematic structural view of an optical imaging lens assembly according to embodiment 11 of the present disclosure.

An optical imaging lens assembly according to embodiment 11 of the present disclosure is described below with reference to FIG. 21 to FIG. 22D. FIG. 21 is a schematic structural view of the optical imaging lens assembly according to embodiment 11 of the present disclosure.

As shown in FIG. 21, the optical imaging lens assembly according to an exemplary implementation of the present disclosure includes, sequentially from an object side to an image side along an optical axis: a first lens E1, a second lens E2, a third lens E3, a fourth lens E4, a fifth lens E5, an optical filter E6 and an imaging plane S13.

The first lens E1 has positive refractive power, an object-side surface S1 thereof is a convex surface, and an image-side surface S2 thereof is a concave surface. The second lens E2 has positive refractive power, an object-side surface S3 thereof is a convex surface, and an image-side surface S4 thereof is a concave surface. The third lens E3 has negative refractive power, an object-side surface S5 thereof is a concave surface, and an image-side surface S6 thereof is a convex surface. The fourth lens E4 has positive refractive power, an object-side surface S7 thereof is a convex surface, and an image-side surface S8 thereof is a convex surface. The fifth lens E5 has negative refractive power, an object-side surface S9 thereof is a convex surface, and an image-side surface S10 thereof is a concave surface. The optical filter E6 has an object-side surface S11 and an image-side surface S12. Light from an object sequentially passes through the respective surfaces S1 to S12 and is finally imaged on the imaging plane S13.

The optical imaging lens assembly of the present embodiment may further include a stop STO disposed between the object side and the first lens E1, to improve an imaging quality of the optical imaging lens assembly.

Table 31 shows surface type, radius of curvature, thickness, material and conic coefficient of each lens of the optical imaging lens assembly in embodiment 11, wherein the units for the radius of curvature and the thickness are millimeter (mm). Table 32 shows high-order coefficients applicable to each aspheric surface in embodiment 11, wherein the surface type of each aspheric surface may be defined by the formula (1) given above in embodiment 1. Table 33 shows effective focal lengths f1 to f5 of the lenses, a total effective focal length f, a total optical length TTL, half of a diagonal length ImgH of an effective pixel area on the imaging plane S13, half of a maximal field-of-view angle Semi-FOV, and a ratio of the total effective focal length f to an entrance pupil diameter EPD of the optical imaging lens assembly in embodiment 11.

TABLE 31

| Surface number | Surface type | Radius of curvature | Thickness | Material Refractive index | Abbe number | Conic coefficient |
|---|---|---|---|---|---|---|
| OBJ | spherical | infinite | infinite | | | |
| STO | spherical | infinite | −0.4104 | | | |
| S1 | aspheric | 1.9701 | 0.7616 | 1.55 | 56.1 | −0.4083 |
| S2 | aspheric | 6.2357 | 0.0439 | | | −15.9345 |
| S3 | aspheric | 7.6974 | 0.2400 | 1.67 | 19.2 | 41.9454 |
| S4 | aspheric | 7.8555 | 0.5865 | | | 13.4524 |
| S5 | aspheric | −5.7542 | 0.7000 | 1.57 | 38.0 | 6.6036 |
| S6 | aspheric | −12.3206 | 0.4042 | | | −99.0000 |
| S7 | aspheric | 12.5400 | 1.0000 | 1.55 | 56.1 | −99.0000 |
| S8 | aspheric | −4.5017 | 0.6607 | | | 0.0560 |
| S9 | aspheric | 16.7168 | 0.6000 | 1.54 | 55.9 | −46.7073 |
| S10 | aspheric | 1.7494 | 0.4045 | | | −6.5458 |
| S11 | spherical | infinite | 0.2963 | 1.52 | 64.2 | |
| S12 | spherical | infinite | 0.3709 | | | |
| S13 | spherical | infinite | | | | |

TABLE 32

| Surface number | A4 | A6 | A8 | A10 | A12 |
|---|---|---|---|---|---|
| S1 | 1.3281E−03 | 2.4812E−02 | −6.3050E−02 | 1.0800E−01 | −1.3588E−01 |
| S2 | −3.4889E−02 | −1.1124E−01 | 3.9416E−01 | −7.2395E−01 | 8.1044E−01 |
| S3 | −6.2651E−02 | 1.7655E−02 | −1.8176E−01 | 1.1473E+00 | −2.9643E+00 |
| S4 | 2.1100E−03 | −1.2576E−01 | 8.0706E−01 | −2.5073E+00 | 4.8968E+00 |
| S5 | −1.8965E−02 | −2.4469E−01 | 1.0421E+00 | −2.7567E+00 | 4.6209E+00 |
| S6 | −3.7815E−02 | −6.8969E−02 | 1.3435E−01 | −1.5624E−01 | 1.2206E−01 |
| S7 | 1.4383E−02 | −8.7009E−02 | 1.0904E−01 | −1.0024E−01 | 6.0464E−02 |

TABLE 32-continued

| | | | | | |
|---|---|---|---|---|---|
| S8 | 3.3013E−02 | −4.3008E−02 | 3.3851E−02 | −1.8584E−02 | 6.5698E−03 |
| S9 | −1.3351E−01 | 3.7458E−02 | −4.4473E−03 | 1.3314E−04 | 2.9555E−05 |
| S10 | −6.2710E−02 | 2.1335E−02 | −5.6673E−03 | 1.0906E−03 | −1.4116E−04 |

| Surface number | A14 | A16 | A18 | A20 |
|---|---|---|---|---|
| S1 | 1.1785E−01 | −6.6989E−02 | 2.1689E−02 | −3.0002E−03 |
| S2 | −5.2573E−01 | 1.6592E−01 | −8.2492E−03 | −5.3450E−03 |
| S3 | 4.2304E+00 | −3.4709E+00 | 1.5349E+00 | −2.8447E−01 |
| S4 | 6.0202E+00 | 4.5212E+00 | −1.8915E+00 | 3.3762E−01 |
| S5 | −4.9098E+00 | 3.2001E+00 | −1.1640E+00 | 1.8013E−01 |
| S6 | −6.2169E−02 | 2.0198E−02 | −3.7664E−03 | 3.0236E−04 |
| S7 | −2.3656E−02 | 5.8252E−03 | −8.2135E−04 | 5.0591E−05 |
| S8 | −1.4381E−03 | 1.8888E−04 | −1.3686E−05 | 4.2118E−07 |
| S9 | −4.2120E−06 | 2.5201E−07 | −7.5062E−09 | 9.0856E−11 |
| S10 | 1.1626E−05 | −5.7760E−07 | 1.5716E−08 | −1.7964E−10 |

TABLE 33

| | | | |
|---|---|---|---|
| f1(mm) | 4.96 | f(mm) | 5.03 |
| f2(mm) | 350.00 | TTL(mm) | 6.06 |
| f3(mm) | −19.69 | ImgH(mm) | 4.60 |
| f4(mm) | 6.20 | Semi-FOV(°) | 41.4 |
| f5(mm) | −3.69 | f/EPD | 2.04 |

Figure 22A:
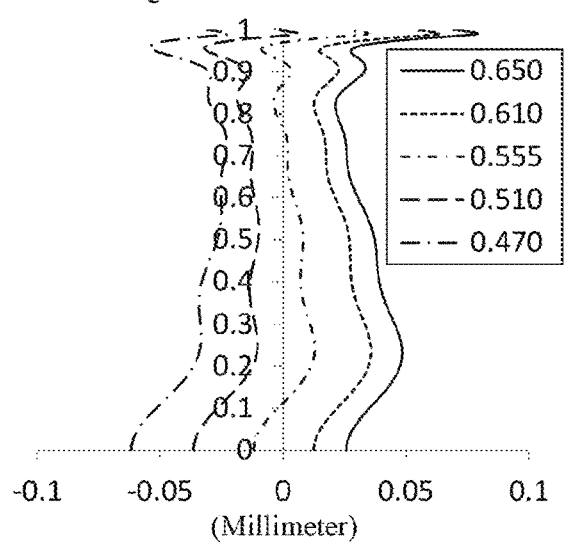
FIGS. 22A-22D illustrate a longitudinal aberration curve, an astigmatic curve, a distortion curve and a lateral color curve of the optical imaging lens assembly according to embodiment 11, respectively.
Figure 22B:
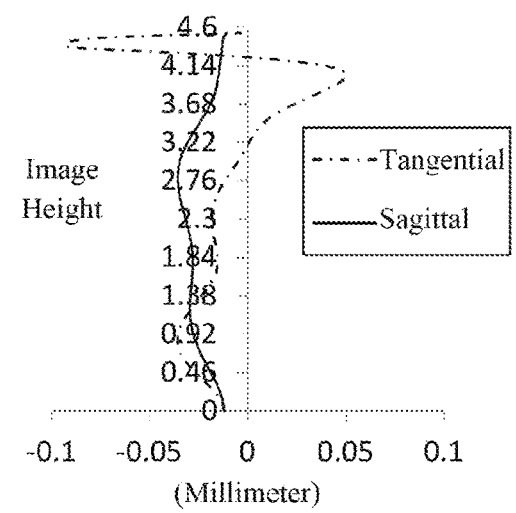
Figure 22C:
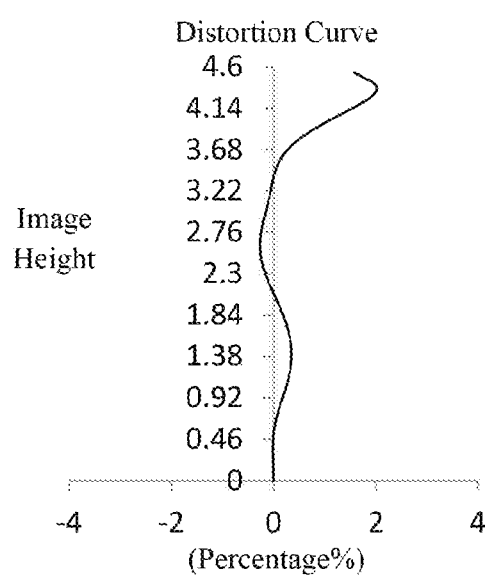
Figure 22D:
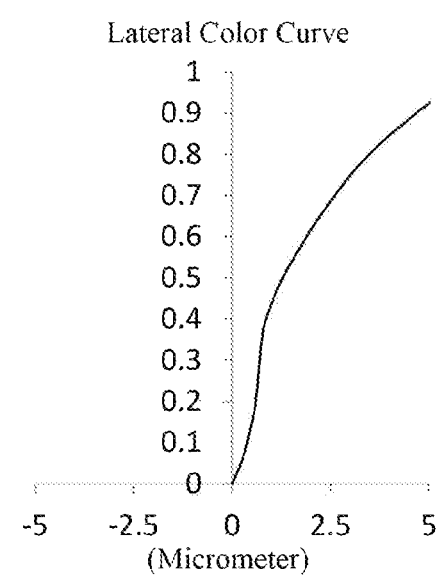

FIG. 22A illustrates a longitudinal aberration curve of the optical imaging lens assembly according to embodiment 11, representing deviations of focal points focused by light of different wavelengths after passing through the optical imaging lens assembly. FIG. 22B illustrates an astigmatic curve of the optical imaging lens assembly according to embodiment 11, representing a curvature of a tangential plane and a curvature of a sagittal plane. FIG. 22C illustrates a distortion curve of the optical imaging lens assembly according to embodiment 11, representing amounts of distortion corresponding to different image heights. FIG. 22D illustrates a lateral color curve of the optical imaging lens assembly according to embodiment 11, representing deviations of different image heights on an imaging plane after the light passes through the optical imaging lens assembly. It can be seen from FIG. 22A to FIG. 22D that the optical imaging lens assembly provided in embodiment 11 can achieve good image quality.

In view of the above, embodiments 1 to 11 respectively satisfy the relationship shown in Table 34.

TABLE 34

| Conditional\embodiment | 1 | 2 | 3 | 4 | 5 | 6 | 7 | 8 | 9 | 10 | 11 |
|---|---|---|---|---|---|---|---|---|---|---|---|
| f*tan(Smei-FOV)(mm) | 4.57 | 4.56 | 4.47 | 4.54 | 4.45 | 4.44 | 4.54 | 4.46 | 4.49 | 4.42 | 4.44 |
| TTL/ImgH | 1.29 | 1.30 | 1.32 | 1.30 | 1.33 | 1.33 | 1.30 | 1.33 | 1.32 | 1.33 | 1.32 |
| f1/f | 0.91 | 0.89 | 0.88 | 0.88 | 0.89 | 0.89 | 0.89 | 0.81 | 0.92 | 0.92 | 0.99 |
| f/f123 | 0.88 | 0.88 | 0.88 | 0.89 | 0.87 | 0.80 | 0.88 | 0.81 | 0.86 | 0.98 | 0.84 |
| f/(f1 − f5) | 0.63 | 0.54 | 0.66 | 0.55 | 0.61 | 0.59 | 0.61 | 0.64 | 0.62 | 0.37 | 0.58 |
| f1/f45 | −0.34 | −0.34 | −0.40 | −0.37 | −0.25 | −0.12 | −0.35 | −0.20 | −0.25 | −0.53 | −0.27 |
| (R4 − R1)/(R4 + R1) | 0.35 | 0.35 | 0.35 | 0.34 | 0.35 | 0.35 | 0.54 | 0.22 | 0.45 | 0.39 | 0.60 |
| CT2/CT3 | 0.47 | 0.38 | 0.43 | 0.43 | 0.48 | 0.48 | 0.43 | 0.42 | 0.38 | 0.43 | 0.34 |
| CT5/CT4 | 0.55 | 0.89 | 0.54 | 0.80 | 0.48 | 0.47 | 0.54 | 0.56 | 0.64 | 0.64 | 0.60 |
| (T12 + T23)/(T34 + T45) | 0.35 | 0.43 | 0.37 | 0.43 | 0.48 | 0.50 | 0.30 | 0.32 | 0.57 | 0.43 | 0.59 |
| SD/TTL | 0.77 | 0.76 | 0.80 | 0.75 | 0.75 | 0.76 | 0.75 | 0.77 | 0.74 | 0.75 | 0.76 |
| TD/SL | 0.89 | 0.88 | 0.93 | 0.89 | 0.87 | 0.88 | 0.89 | 0.87 | 0.88 | 0.89 | 0.88 |
| ET5/(ET2 + ET3 + ET4) | 0.59 | 0.39 | 0.51 | 0.31 | 0.49 | 0.49 | 0.64 | 0.48 | 0.44 | 0.23 | 0.27 |
| (SAG31 + SAG32)/(SAG51 + SAG52) | 0.42 | 0.47 | 0.26 | 0.42 | 0.37 | 0.38 | 0.40 | 0.55 | 0.32 | 0.55 | 0.29 |
| V3 | 38.00 | 38.00 | 38.00 | 38.00 | 38.00 | 38.00 | 38.00 | 38.00 | 38.00 | 38.00 | 38.00 |
| N3 | 1.57 | 1.57 | 1.57 | 1.57 | 1.57 | 1.57 | 1.57 | 1.57 | 1.57 | 1.57 | 1.57 |

The present disclosure further provides an imaging apparatus, having an electronic photosensitive element which may be a photosensitive charge-coupled device (CCD) or complementary metal-oxide semiconductor (CMOS). The imaging apparatus may be an independent imaging device such as a digital camera, or may be an imaging module integrated in a mobile electronic device such as a mobile phone. The imaging apparatus is equipped with the optical imaging lens assembly described above.

The foregoing is only a description of the preferred embodiments of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An optical imaging lens assembly, comprising a first lens, a second lens, a third lens, a fourth lens, and a fifth lens, which are sequentially arranged from an object side to an image side along an optical axis,
wherein,
the first lens has positive refractive power, and an object-side surface of the first lens is a convex surface;
the second lens has refractive power, and an image-side surface of the second lens is a concave surface;
the third lens has refractive power;
the fourth lens has refractive power;
the fifth lens has negative refractive power; and
wherein 0.6<f/f123<1, where $f$ is a total effective focal length of the optical imaging lens assembly, and f123 is a combined focal length of the first lens, the second lens, and the third lens;
wherein TTL/ImgH<1.5, where TTL is a distance along the optical axis from the object-side surface of the first lens to an imaging plane of the optical imaging lens assembly, and ImgH is half of a diagonal length of an effective pixel area on the imaging plane of the optical imaging lens assembly; and
wherein 4.1 mm<f*tan (Semi-FOV)<4.8 mm, where $f$ is a total effective focal length of the optical imaging lens assembly and Semi-FOV is half of a maximal field-of-view angle of the optical imaging lens assembly.

2. The optical imaging lens assembly according to claim 1,
wherein 0.5<f1/f<1, where f1 is an effective focal length of the first lens and $f$ is the total effective focal length of the optical imaging lens assembly.

3. The optical imaging lens assembly according to claim 1,
wherein −0.6<f1/f45<0, where f1 is an effective focal length of the first lens, and f45 is a combined focal length of the fourth lens and the fifth lens.

4. The optical imaging lens assembly according to claim 1,
wherein 0.2<ET5/(ET2+ET3+ET4)<0.7, where ET2 is an edge thickness of the second lens, ET3 is an edge thickness of the third lens, ET4 is an edge thickness of the fourth lens, and ET5 is an edge thickness of the fifth lens.

5. The optical imaging lens assembly according to claim 1,
wherein 0.2<(SAG31+SAG32)/(SAG51+SAG52)<0.7, where,
SAG31 is a distance along the optical axis from an intersection of an object-side surface of the third lens and the optical axis to a vertex of an effective radius of the object-side surface of the third lens,
SAG32 is a distance along the optical axis from an intersection of an image-side surface of the third lens and the optical axis to a vertex of an effective radius of the image-side surface of the third lens,
SAG51 is a distance along the optical axis from an intersection of an object-side surface of the fifth lens and the optical axis to a vertex of an effective radius of the object-side surface of the fifth lens, and
SAG52 is a distance along the optical axis from an intersection of an image-side surface of the fifth lens and the optical axis to a vertex of an effective radius of the image-side surface of the fifth lens.

6. The optical imaging lens assembly according to claim 1,
wherein 36<V3<40, where V3 is an abbe number of the third lens, and
wherein 1.55<N3<1.58, where N3 is a refractive index of the third lens.

7. The optical imaging lens assembly according to claim 1,
wherein 0.2<f/(f1-f5)<0.7, where $f$ is a total effective focal length of the optical imaging lens assembly, f1 is an effective focal length of the first lens, and f5 is an effective focal length of the fifth lens.

8. The optical imaging lens assembly according to claim 1,
wherein −0.6<f1/f45<0, where f1 is an effective focal length of the first lens, and f45 is a combined focal length of the fourth lens and the fifth lens.

9. The optical imaging lens assembly according to claim 1,
wherein 0.2<(R4-R1)/(R4+R1)<0.7, where R1 is a radius of curvature of the object-side surface of the first lens, and R4 is a radius of curvature of the image-side surface of the second lens.

10. The optical imaging lens assembly according to claim 1,
wherein 0.2<(T12+T23)/(T34+T45)<0.7, where T12 is a spaced interval between the first lens and the second lens along the optical axis, T23 is a spaced interval between the second lens and the third lens along the optical axis, T34 is a spaced interval between the third lens and the fourth lens along the optical axis, and T45 is a spaced interval between the fourth lens and the fifth lens along the optical axis.

11. The optical imaging lens assembly according to claim 1,
wherein 0.2<ET5/(ET2+ET3+ET4)<0.7, where ET2 is an edge thickness of the second lens, ET3 is an edge thickness of the third lens, ET4 is an edge thickness of the fourth lens, and ET5 is an edge thickness of the fifth lens.

12. The optical imaging lens assembly according to claim 1, wherein the optical imaging lens assembly further comprises a stop, and
wherein 0.6<SD/TTL<0.9, where SD is a distance along the optical axis from the stop to an image-side surface of the fifth lens, and TTL is a distance along the optical axis from the object-side surface of the first lens to an imaging plane of the optical imaging lens assembly.

13. The optical imaging lens assembly according to claim 12,
wherein 0.7<TD/SL<1, where TD is a distance along the optical axis from the object-side surface of the first lens to the image-side surface of the fifth lens, and SL is a distance along the optical axis from the stop to the imaging plane of the optical imaging lens assembly.

14. The optical imaging lens assembly according to claim 1,
wherein 0.2<CT2/CT3<0.5, where CT2 is a center thickness of the second lens along the optical axis, and CT3 is a center thickness of the third lens along the optical axis.

15. The optical imaging lens assembly according to claim 14,
- wherein 0.4<CT5/CT4<0.9, where CT4 is a center thickness of the fourth lens along the optical axis, and CT5 is a center thickness of the fifth lens along the optical axis.

16. The optical imaging lens assembly according to claim 1, wherein the optical imaging lens assembly further comprises a stop, and
- wherein 0.6<SD/TTL <0.9, where SD is a distance along the optical axis from the stop to an image-side surface of the fifth lens, and TTL is the distance along the optical axis from the object-side surface of the first lens to the imaging plane of the optical imaging lens assembly.

17. The optical imaging lens assembly according to claim 16,
- wherein 0.7<TD/SL<1, where TD is a distance along the optical axis from the object-side surface of the first lens to the image-side surface of the fifth lens, and SL is a distance along the optical axis from the stop to the imaging plane of the optical imaging lens assembly.

\* \* \* \* \*